US008446313B2

(12) United States Patent
Miyagawa et al.

(10) Patent No.: US 8,446,313 B2
(45) Date of Patent: May 21, 2013

(54) SLOT ARRAY ANTENNA AND RADAR DEVICE

(75) Inventors: Tetsuya Miyagawa, Nishinomiya (JP); Koji Yano, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 196 days.

(21) Appl. No.: 13/176,529

(22) Filed: Jul. 5, 2011

(65) Prior Publication Data

US 2012/0007771 A1 Jan. 12, 2012

(30) Foreign Application Priority Data

Jul. 6, 2010 (JP) ................................ 2010-153613

(51) Int. Cl.
*G01S 7/28* (2006.01)
(52) U.S. Cl.
USPC .......................................... 342/175; 343/771
(58) Field of Classification Search
USPC .......................................... 342/175; 343/771
See application file for complete search history.

(56) References Cited

U.S. PATENT DOCUMENTS

| 4,821,044 A | * | 4/1989 | Kurtz ............................. 343/771 |
| 4,977,406 A | * | 12/1990 | Tsukamoto et al. ... 343/700 MS |
| 5,061,943 A | * | 10/1991 | Rammos ........................ 343/770 |
| 5,189,433 A | * | 2/1993 | Stern et al. .................... 343/770 |
| 5,541,612 A | * | 7/1996 | Josefsson ...................... 343/771 |
| 6,166,701 A | * | 12/2000 | Park et al. ..................... 343/771 |
| 7,379,029 B2 | * | 5/2008 | Rolnik .......................... 343/770 |
| 2002/0101385 A1 | * | 8/2002 | Huor ............................. 343/770 |
| 2009/0303145 A1 | * | 12/2009 | Shijo et al. .................... 343/767 |
| 2010/0085263 A1 | | 4/2010 | Yano |
| 2011/0248883 A1 | * | 10/2011 | Miyagawa et al. ........... 342/175 |
| 2012/0007771 A1 | * | 1/2012 | Miyagawa et al. ........... 342/175 |

FOREIGN PATENT DOCUMENTS

| DE | 4201933 A1 | * | 7/1993 |
| EP | 440126 A1 | * | 8/1991 |
| FR | 2733357 A1 | * | 10/1996 |
| JP | 57060705 A | * | 4/1982 |
| JP | 2006005598 A | * | 1/2006 |
| JP | 2007295396 A | * | 11/2007 |
| JP | 2009296376 A | * | 12/2009 |
| JP | 2011223361 A | * | 11/2011 |
| WO | WO 2008/018481 A1 | | 2/2008 |

OTHER PUBLICATIONS

Morini, A.; Rozzi, T.; Venanzoni, G., "On the analysis of slotted waveguide arrays," Antennas and Propagation, IEEE Transactions on, vol. 54, No. 7, pp. 2016,2021, Jul. 2006.*

* cited by examiner

*Primary Examiner* — John B Sotomayor
(74) *Attorney, Agent, or Firm* — Birch, Stewart, Kolasch & Birch, LLP

(57) ABSTRACT

This disclosure provides a slot array antenna, which includes an emission waveguide having a conductor surface where emission slot rows are formed and for guiding electromagnetic waves to be emitted from the emission slot rows, each of the emission slot rows having a plurality of emission slots are arrayed in line, and a lattice. The lattice includes a plurality of conductor walls formed in a planer shape so as to extend in a direction intersecting with the conductor surface and repeatedly arranged corresponding to the plurality of emission slots, and a base plate coupling and fixing the plurality of conductor walls thereto, the base plate being fastened to the conductor surface of the emission waveguide.

20 Claims, 18 Drawing Sheets

SLOT ARRAY ANTENNA AND RADAR DEVICE

CROSS-REFERENCE TO RELATED APPLICATION(S)

The application claims priority under 35 U.S.C. §119 to Japanese Patent Application No. 2010-153613, which was filed on Jul. 6, 2010, the entire disclosure of which is hereby incorporated by reference.

TECHNICAL FIELD

The present invention relates to a slot array antenna that is used for radars, communication instruments, or broadcast instruments, and relates to a radar device equipped with the slot array antenna.

BACKGROUND OF THE INVENTION

Generally, slot array antennas, in which two or more slots which resonate with transceiving electromagnetic waves are arranged in a side face of a waveguide, have high side lobe level characteristics with a low gain. A slot array antenna where the characteristics are improved is proposed in WO2008/018481.

FIGS. 18A and 18B show an example of the slot array antenna disclosed in WO2008/018481. FIG. 18A is an elevational view showing a configuration of the slot array antenna disclosed in WO2008/018481, and FIG. 18B is a bottom view. A slot array antenna 100 shown in FIGS. 18A and 18B mainly includes an emission waveguide 130 where two or more slots 131 are arranged two-dimensionally and an introduction waveguide 120 where two or more slots 121 for introducing electromagnetic waves into a waveguide space of the emission waveguide 130 are arranged.

The emission waveguide 130 is a waveguide having a rectangular cross section, where many rows of slots 131 are arranged parallel to each other in the x-axis direction in a first conductor plane metal plate 130a of the emission waveguide 130, while each row of the slots being arranged in line in the y-axis direction. A second conductor plane metal plate 130b is also arranged in parallel to the first conductor plane metal plate 130a. The first and second metal plates 130a and 130b for conductor planes are joined with each other with screws 133 and supported by support members 132 which are disposed at location corresponding to nodes of the electromagnetic waves propagating within the emission waveguide 130 and nodes of tube wall current. The waveguide space is formed between the first conductor plane metal plate 130a and the second conductor plane metal plate 130b. A radio wave absorber 134 is provided at one end of the emission waveguide 130 in the x-axis direction, and a short circuit surface is formed at the other end. Two side faces which connect the first conductor plane metal plate 130a and the second conductor plane metal plate 130b (top and bottom surfaces) also serve as short circuit surfaces.

The introduction waveguide 120 is formed so as to have the second conductor plane metal plate 130b of the emission waveguide 130 as one side thereof. The introduction waveguide 120 is formed by attaching a gutter-shaped metal plate to the second conductor plane metal plate 130b. The introduction waveguide 120 is attached so that the y-axis direction is oriented along a propagating direction of the electromagnetic waves. The slots 121 of the introduction waveguide 120 are formed in the second conductor plane metal plate 130b and arrayed in the y-axis direction.

The slots 121 are arranged along the propagating direction of the electromagnetic waves within the introduction waveguide 120 at every half wavelength or at every positive number times of the half wavelength of the electromagnetic waves within the introduction waveguide 120. The electromagnetic waves in a high order mode in which two or more magnetic field loops are located in line in the propagating direction of the electromagnetic waves within the introduction waveguide 120 are excited by the emission waveguide 130. The slots 131 are formed such that primary polarized wave planes of emission electric fields caused by the slots 131 couple to the electromagnetic waves in the high order mode face to be directed in the same direction, and other polarized wave components which intersect perpendicular to the primary polarized wave planes are cancelled with each other.

The slot array antenna 100 constituted as described above can emit the electromagnetic waves from the first conductor plane metal plate 130a, while interrupting the tube wall current in the high order mode at suitable locations by the slots 131 formed in the emission waveguide 130. For this reason, although it is a slot array antenna, a side lobe control is easy. For example, the geometry of the slots 131 of the emission waveguide 130 are set so that the intensities of the electromagnetic waves to be emitted become lower as the slots are separated from the center of the emission waveguide 130 in the electromagnetic wave propagating direction toward both ends of the emission waveguide 130. Thereby, the side lobes of the electromagnetic waves emitted from the emission waveguide 130 are effectively suppressed.

Again, although the slot array antenna 100 disclosed in WO2008/018481 is a slot array antenna, it has the outstanding characteristic that the side lobe control is easy.

However, in a case where the slot array antenna 100 disclosed in WO2008/018481 is used as an antenna for ship radar, when the ship presents surge and sway motions and an angle of the antenna with respect to the vertical axis (an angle with respect to the z-axis in the y-z plane) varies, a situation where the suppressing effect of the side lobes is reduced may occur.

SUMMARY OF THE INVENTION

Thus, the present invention is made in view of the above situations, and provide a low-cost slot array antenna that can fully obtain the suppressing effect of side lobes, even if it is used at a location that may present surge and sway motions, such as in a ship.

According to one aspect of the present invention, a slot array antenna is provided, which includes an emission waveguide having a conductor surface where emission slot rows are formed and for guiding electromagnetic waves to be emitted from the emission slot rows, each of the emission slot rows having a plurality of emission slots are arrayed in line, and a lattice. The lattice includes a plurality of conductor walls formed in a planer shape so as to extend in a direction intersecting with the conductor surface and repeatedly arranged corresponding to the plurality of emission slots, and a base plate coupling and fixing the plurality of conductor walls thereto, the base plate being fastened to the conductor surface of the emission waveguide.

According to the slot array antenna, a sufficient suppressing effect of side lobes of the electromagnetic waves emitted from the emission slot rows can be acquired by the plurality of conductor walls. Moreover, the slot array antenna can be easily assembled only by fastening the base plate to the conductor surface, and is robust.

The emission waveguide may guide the electromagnetic waves in a horizontal direction along the conductor surface, and the emission slot rows are formed by arranging the plurality of emission slots in the horizontal direction. Each of the plurality of conductor walls may be formed in a planer shape extending in a vertical direction along the conductor surface and the intersecting direction, and the plurality of conductor walls may be repeatedly arranged in the horizontal direction corresponding to the plurality of emission slots.

The plurality of emission slot rows may be formed in the vertical direction in the conductor surface of the emission waveguide.

Two of the plurality of conductor walls may be arranged between the adjacent emission slots, and adjacent two of the conductor walls on both sides of each of the emission slots may be coupled to each other to surround a space of the emission slot on the electromagnetic wave emission side.

The slot array antenna may further include an introduction waveguide having an introduction slot array that opens to the emission waveguide to introduce the electromagnetic waves into the emission waveguide. The introduction slot array may excite within the emission waveguide the electromagnetic waves in a high order mode in which a plurality of magnetic field loops are located in line in the vertical direction. The emission waveguide further may have another conductor surface that are arranged in parallel to the conductor surface and opposes to the conductor surface. The plurality of emission slots of the emission waveguide may be formed so that primary polarized wave planes of emission electric fields couple to the electromagnetic waves in a high order mode and are directed in the same direction, and polarized wave components perpendicular to the primary polarized wave planes are cancelled out by each other.

The base plate may have a conductor layer that is electrically coupled to sides of the plurality of the conductor walls on the side of the conductor surface of the emission waveguide and contacts the conductor surface. A height of the plurality of conductor walls with respect to the conductor surface may be set between 1/2×0.8 to 1/2×1.2 of a wavelength of an operating frequency. The slot array antenna may further include a fastener attached to the emission waveguide so as not project into an internal space of the emission waveguide and fastening the conductor surface of the emission waveguide to the base plate that is stacked onto the conductor surface so that the conductor layer are pressed against the conductor surface of the emission waveguide.

The conductor surface of the emission waveguide may be formed from a first metal plate. The emission waveguide may have a second metal plate arranged in parallel to and opposing to the first metal plate. The fastener may be attached to the emission waveguide so as to sandwich the first metal plate and the second metal plate.

The fastener may be a clip having a first blade part for pushing the base plate, a second blade part for pushing the second metal plate, and an elastic part connecting the first blade part with the second blade part.

The first blade part may be formed in a comb shape. The clip may be designed, in a state where the clip pinches the base plate and the second metal plate, so that teeth portion of the first blade part presses an area where the plurality of conductor walls and the plurality of emission slots are not formed.

The clip may further have a protruded piece covering a boundary part between the base plate and the conductor surface of the emission waveguide.

The first metal plate and the second metal plate may have a rectangular shape of the same size so that corresponding long sides of the metal plates are in parallel to each other. The emission waveguide may further have a first support member and a second support member supporting the long sides of the first metal plate and the long sides of the second metal plate, respectively. The base plate may have ribs provided along the long sides of the first metal plate of the emission waveguide. The first blade part may have a projecting part projecting to substantially the same side as the second blade part so that, when the clip is pushed to be attached in a state where the projecting part of the first blade part is hooked on the rib, the second blade part line-contacts near the long side of the second metal plate, and the second blade part then surface-contacts the surface of the second metal plate in a state where the clip pinches the second metal plate and the base plate.

The slot array antenna may further include a fastener including a lattice side coupling member and an electrically conductive waveguide side coupling member coupled to the lattice side coupling member, and for fastening the base plate of the lattice to the conductor surface of the emission waveguide. The emission waveguide may include a conductor plate having a concave portion formed in an inner principal surface facing an internal space of the emission waveguide and an aperture part continuing from a part of the concave portion to the conductor surface. The base plate of the lattice may have a attaching part to which the lattice side coupling member is attached. The waveguide side coupling member may have a wide part fitted in the concave portion to flatten the inner principal surface and a narrow part extending from the wide part so as to be coupled to the lattice side coupling member, while being exposed to a space on the electromagnetic wave emission side through the aperture part.

The slot array antenna may further include an electrically conductive member arranged between the base plate of the lattice and the conductor surface and electrically contacting the base plate and the conductor surface.

According to another aspect of the present invention, a radar device is provided, which includes the slot array antenna described above, an electromagnetic wave source for supplying the electromagnetic waves to the emission waveguide, a rotary part for rotating the slot array antenna, and a signal processing module for processing of an echo signal received by the slot array antenna.

According to the radar device, a sufficient suppressing effect of side lobes of the electromagnetic waves emitted from the emission slot rows can be acquired by the plurality of conductor walls. Moreover, the slot array antenna can be easily assembled only by fastening the base plate to the conductor surface, and is robust.

According to still another aspect of the present invention, a radar device is provided, which includes the slot array antenna described above, and a cylindrical cover having a substantially circular shape in cross section, for covering the slot array antenna. The conductor surface is arranged near the axial center of the cylindrical cover.

According to the radar device, a sufficient suppressing effect of side lobes of the electromagnetic waves emitted from the emission slot rows can be acquired by the plurality of conductor walls. Moreover, the slot array antenna can be easily assembled only by fastening the base plate to the conductor surface, and is robust.

According to the slot array antenna and/or the radar device, even if the angle of the conductor surface from which the electromagnetic waves of the slot array antenna are emitted is varied when the antenna and/or radar device are used at a location which shakes, such as in a ship, the suppressing effect of the side lobes can be secured by the plurality of conductor walls of the lattice. Since the plurality of conductor walls required for suppressing the side lobes are easily fastened to the emission waveguide by the base plate of the lattice, the slot array antenna and/or the radar device can be provided at a lower cost.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Slot array antennas according to the following embodiments of the present invention are antennas which are used for emission of electromagnetic waves, such as for radars, communication instruments, and broadcast apparatuses. In the following embodiments, although slot array antennas for radars are particularly described as examples of the above slot array antennas, the present invention is not limited to the slot array antenna for radars, as described above. In the following embodiment, the orientations or directions are exemplary described taking the typical applications of this kind of antenna, and, therefore, the orientations and directions may alter according to the applications of this antenna.

First Embodiment (1) Entire Configuration

Figure 1:
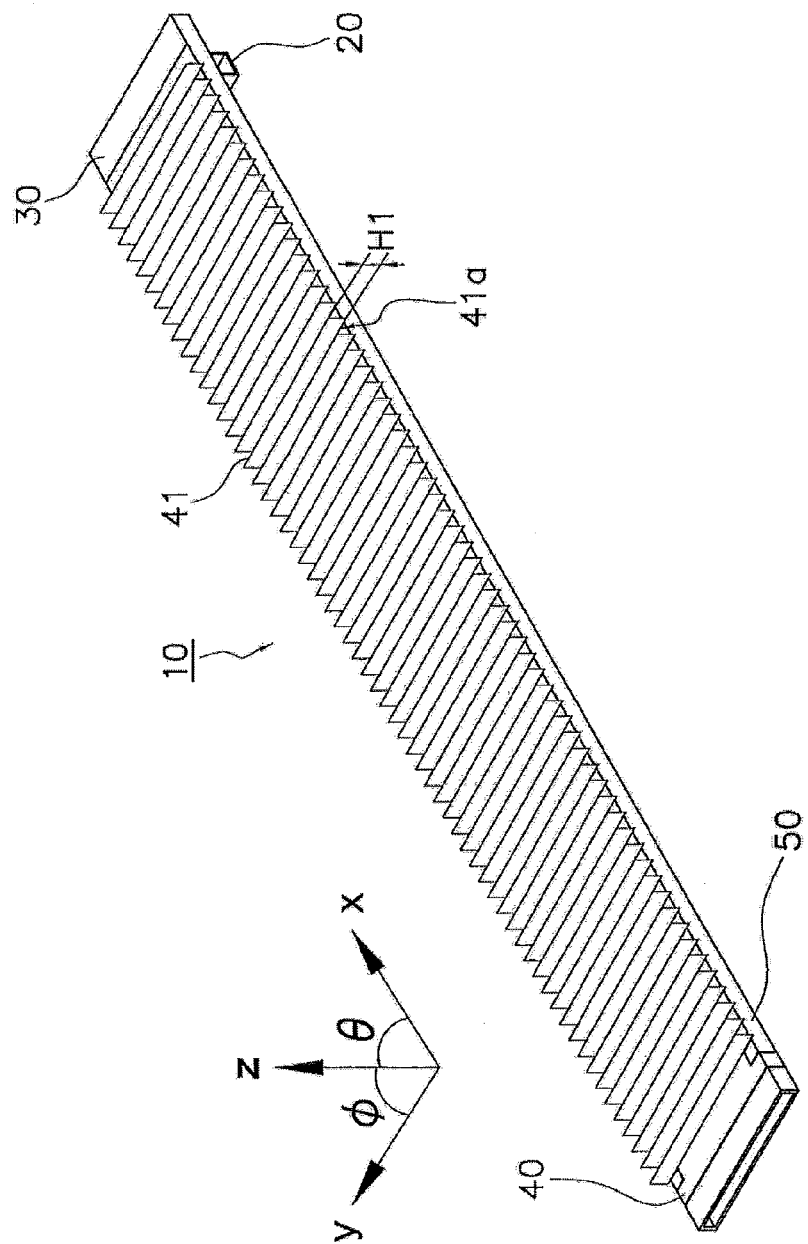
FIG. 1 is a perspective view of a slot array antenna according to a first embodiment of the invention.
Figure 2A:
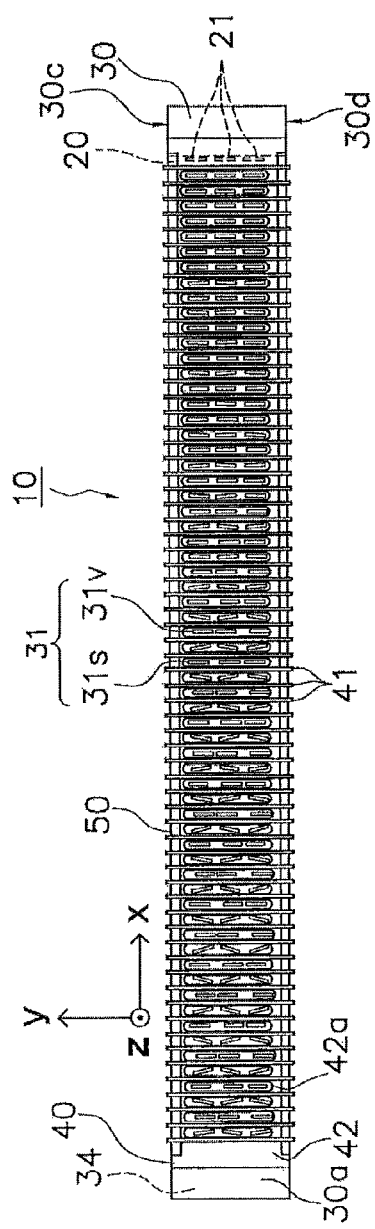
FIG. 2A is an elevational view of the slot array antenna shown in FIG. 1.
Figure 2B:
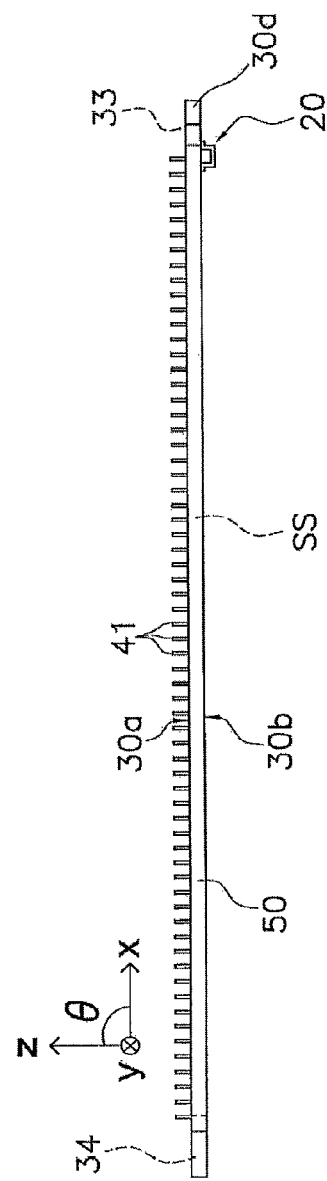
FIG. 2B is a bottom view of the slot array antenna.
Figure 3:
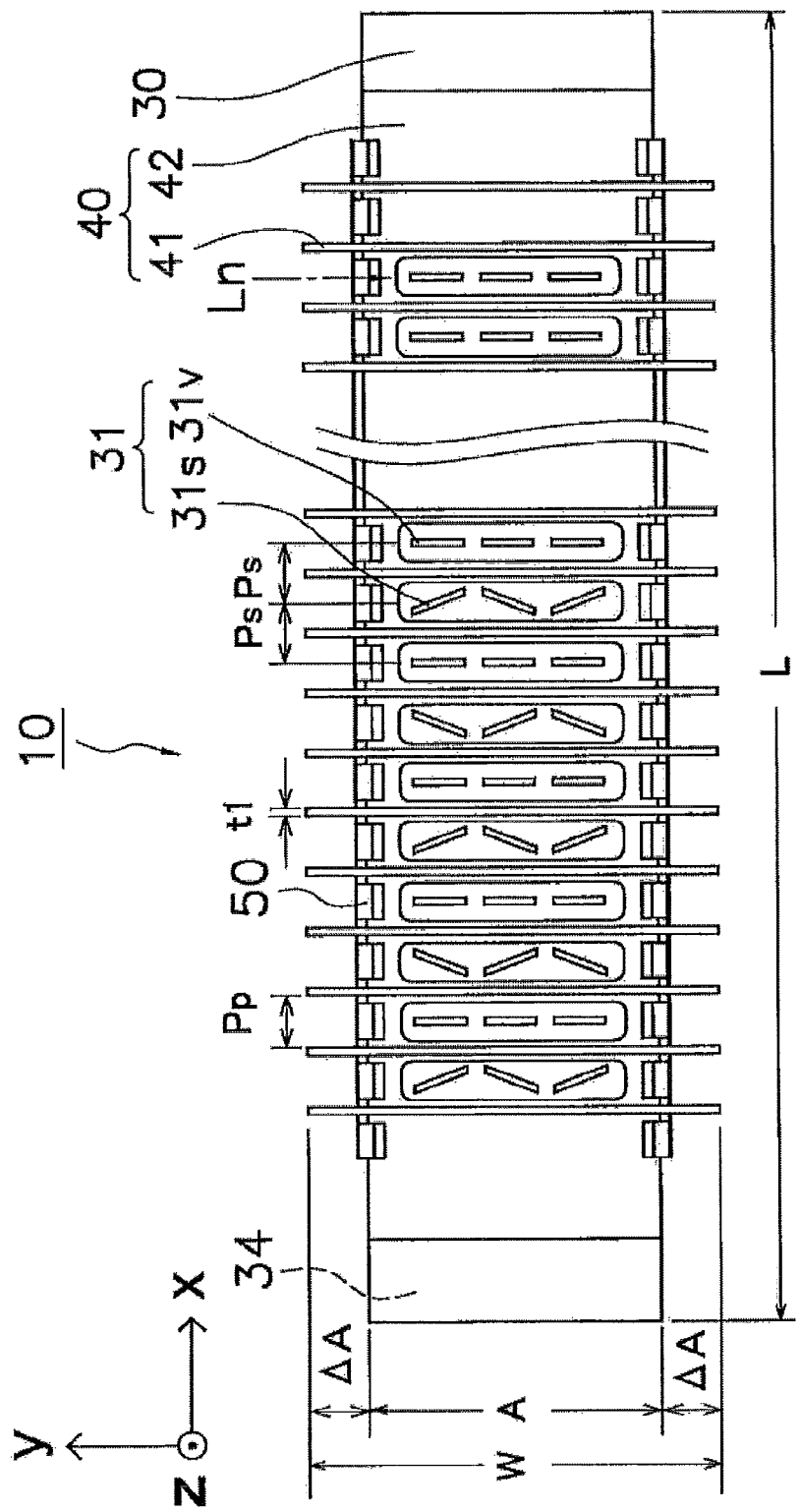
FIG. 3 is a view illustrating an arrangement of emission slots and a metal wall of the slot array antenna of FIG. 1.

The entire configuration of a slot array antenna 10 according to a first embodiment of the present invention is described referring to FIGS. 1 and 2. FIG. 1 is a perspective view showing a general view of the slot array antenna 10 of this embodiment. FIG. 2A is an elevational view of the slot array antenna 10 shown in FIG. 1, and FIG. 2B is a bottom view of the slot array antenna 10 shown in FIG. 1. FIG. 3 is an enlarged elevational view showing a part of the side of one end and the other end of an emission waveguide 30.

The slot array antenna 10 shown in FIG. 1 mainly includes an introduction waveguide 20, the emission waveguide 30, a lattice 40, and clips 50. As shown in FIG. 2A, emission slots 31 are arrayed vertically and horizontally in the emission waveguide 30. Electromagnetic waves are emitted from the emission slots 31 in the z-axis direction. An electromagnetic wave propagating direction within the emission waveguide 30 is in the x-axis direction. Moreover, an electromagnetic wave propagating direction within the introduction waveguide 20 is in the y-axis direction.

The emission waveguide 30 is manufactured by punching and bending an aluminum plate. The emission waveguide 30 thus manufactured is formed in a rectangular waveguide of which four side faces are formed from rectangular plates and made of aluminum. Numerous lines or columns Ln of slots (refer to FIG. 3) are formed in a front aluminum plate 30a of the emission waveguide 30, where each column includes two or more emission slots 31 arranged in line in the y-axis direction (vertical direction), and the slot columns are arranged in the x-axis direction (horizontal direction). A back aluminum plate 30b is disposed in parallel to the front aluminum plate 30a. A radio wave absorber 34 is provided at one end of the emission waveguide 30 in the x-axis direction, and, on the other hand, a short circuit surface is formed at the other end. In addition, an upper aluminum plate 30c and a lower aluminum plate 30d, which are two sides connecting and supporting the front aluminum plate 30a and the back aluminum plate 30b, also serve as short circuit surfaces. A space between the front aluminum plate 30a and the back aluminum plates 30b (i.e., a space surrounded by the front aluminum plate 30a, the back aluminum plate 30b, the upper aluminum plate 30c, and the lower aluminum plate 30d) is defined as a waveguide space SS (FIG. 2B). For example, as shown in FIG. 3, the size of the slot array antenna 10 with an operating frequency of 9.41 GHz is such that a length L of the emission waveguide 30 is 895.5 mm and the width A of the same is 88.8 mm.

The introduction waveguide 20 is formed so as to use the back aluminum plate 30b of the emission waveguide 30 as its one side face. The introduction waveguide 20 is formed by bending an aluminum plate in a gutter shape having a substantially rectangular cross section. The gutter-shaped aluminum plate is attached to the introduction waveguide 20 with screws so that the y-axis direction is oriented in the propagating direction of the electromagnetic waves. The introduction slots 21 of the introduction waveguide 20 are formed in the back aluminum plate 30b and, as shown in FIG. 2A, the slots are arrayed in the y-axis direction.

The lattice 40 is fastened to the front side (positive in the z-axis direction) of the front aluminum plate 30a of the emission waveguide 30. The lattice 40 includes a number of metal walls 41 and a metal base plate 42 which couples and fixes the metal walls 41 thereto. The detailed structure of the lattice 40 will be described later.

The clip 50 are attached to the upper aluminum plate 30c and the lower aluminum plate 30d so as to cover the upper aluminum plate 30c and the lower aluminum plate 30d from the outside of the upper aluminum plate 30c and the lower aluminum plate 30d which are side faces. Each clip 50 has a portion of a channel shape in cross section, and it sandwiches the metal base plate 42 and the back aluminum plate 30b by its elastic force so that the metal base plate 42 are pressed onto the front aluminum plate 30a. Thereby, the metal base plate 42 closely contacts the front aluminum plate 30a. The detailed structure of the clip 50 will be described later.

(2) Detailed Configuration (2-1) Arrangement of Introduction Slots

Figure 4:
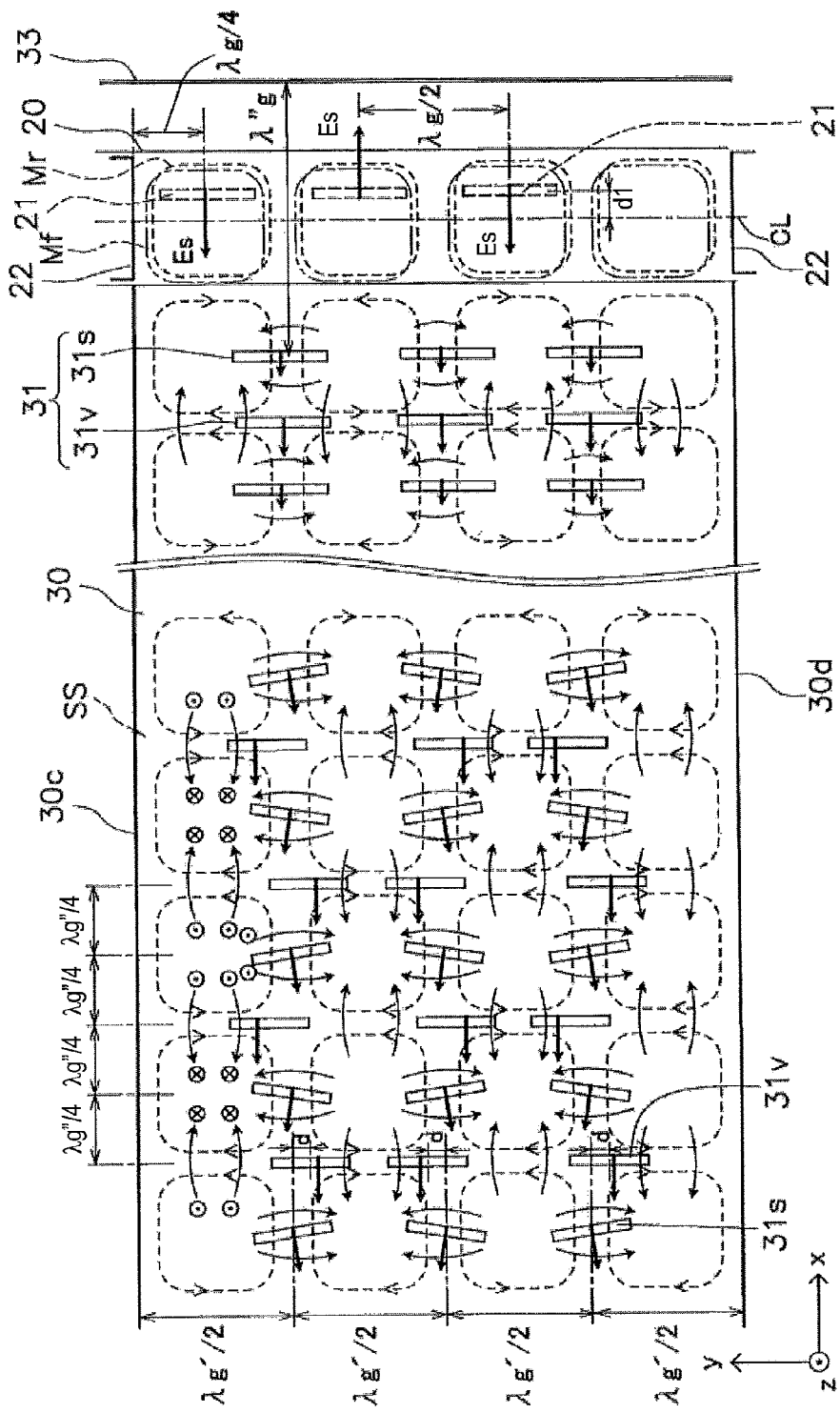
FIG. 4 is a view illustrating an arrangement of introduction slots and the emission slots of the slot array antenna of FIG. 1.

FIG. 4 shows an example in an electromagnetic wave propagation mode within the introduction waveguide 20. Each loop Mf of the two-dotted chain line in the figure is a magnetic field loop which goes around to surround a portion of the introduction waveguide 20 with a high field intensity. Each loop Mr of the broken line in the figure is a magnetic field loop which goes around to surround a portion of the emission waveguide 30 with a high field intensity. Moreover, directions and a distribution of tube wall current are illustrated by arrows of the solid lines which stretch between adjacent magnetic field loops. An excitation probe is provided inside the introduction waveguide 20 shown in FIG. 4, and electric power is supplied to the excitation probe from the exterior through a coaxial connector (not illustrated). In order to obtain the electromagnetic wave propagation mode of FIG. 4, the introduction waveguide 20 is short-circuited at both ends or one end in a short circuit surface 22, and is used as a resonated type where standing waves are produced therein. Therefore, the introduction slots 21 which are nearest to the short circuit surface 22 are arranged so that a distance from the centers thereof to the short circuit surface 22 is set to an approximately integral multiple of $\lambda g/4$ (here, $\lambda g$ is a guide wavelength within the introduction waveguide 20 in the electromagnetic wave propagating direction) in order to form the standing waves. Here, in this embodiment, the introduction slots 21 are arranged at locations where the centers thereof are separated from the short circuit surface 22 only by $\lambda g/4$.

Three introduction slots 21 shown in FIG. 4 are arrayed approximately at a pitch of half wavelength of the guide wavelength $\lambda g$ along the electromagnetic wave propagating direction of the introduction waveguide 20 (y-axis direction). This array pitch is set such that the introduction slots 21 are arranged corresponding to the magnetic field loops along the y-axis direction. Moreover, the introduction slots 21 are oriented so as to be elongated in the y-axis direction. Moreover, in the elevational view, an offset d1 is given to the locating positions of the introduction slots 21 toward the other end of the emission waveguide 30 from an axial center CL of the introduction waveguide 20. The introduction slots 21 thus arranged interrupt the tube wall current which flows in the x-axis direction, and the electromagnetic waves of which electric fields Es are directed in a direction shown by the thick arrows are emitted into the emission waveguide 30 from each of the introduction slots 21. Thus, since the electric fields caused by the electromagnetic waves emitted from the introduction slots 21 arranged repeatedly at about every $\lambda g/2$ are alternately directed in the opposite directions, the electromagnetic waves in a TEn0 mode are propagated within the waveguide space SS. Here, n is the number of peaks of the field intensity distribution in the vertical direction of the emission waveguide 30 (i.e., the electromagnetic wave propagating direction of the introduction waveguide 20 (y-axis direction)). Hereinafter, this mode is referred to as a "high order mode of the TE mode."

In this example, although the introduction slots 21 of the introduction waveguide 20 are repeatedly formed at every half wavelength of the guide wavelength $\lambda g$ in the electromagnetic wave propagating direction of the introduction waveguide 20 (y-axis direction), the introduction slots 21 may also be formed repeatedly approximately at every integral multiple of the guide wavelength $\lambda g$. The introduction slots 21 are thus repeatedly formed at the pitch of integral multiple of the guide wavelength $\lambda g$ because the electromagnetic waves in a TEM mode are to be produced within the emission waveguide 30.

(2-2) Arrangement of Emission Slots

As an example of the case where the slot array antenna 10 is used as the slot array antenna for radars, the x-z plane may be oriented horizontally. In such a case, the emission slots 31 are arranged so that primary polarized wave planes of the emission electric field couple to the electromagnetic waves in the high order mode described above to be oriented horizontally and polarized wave components perpendicular to the horizontal polarized waves (i.e., vertical polarized waves) are cancelled out.

Two kinds of emission slots 31s and 31v are formed as the emission slots 31. In the slot array antenna 10 shown in FIG. 4, columns of the emission slots 31s and columns of the emission slots 31v are formed alternately. For example, one column of the emission slots 31s are formed in line near the short circuit surface 33 at the other end of the emission waveguide 30, and the emission slots 31v are formed in the following column and, then, another column of the emission slots 31s are again formed as the following column. In the example of FIG. 4, each of the emission slots 31s and 31v are formed three per column and, rows (perpendicular to the columns) where the emission slots 31s and 31v belong are counted as a first row, a second row, and a third row from the side of the upper aluminum plate 30c, and columns (i.e., the lines, described above) where the emission slots 31s and 31v belong are counted as a first column, a second column, and a third column from the side of the short circuit surface 33.

The emission slots 31s and 31v which belong to the same row are arranged at substantially the same distance from the upper aluminum plate 30c and the lower aluminum plate 30d which are the short circuit surfaces. As shown in FIG. 4, the emission slots 31s and 31v are arranged so that the center of the emission slot 31s at the first row is placed at a location separated from the upper aluminum plate 30c by about $\lambda g'/2$ (here, $\lambda g'$ is a guide wavelength within the emission waveguide 30 in a direction perpendicular to the electromagnetic wave propagating direction). Similarly, the slots are arranged so that the center of the emission slot 31s of the third row is placed at a location separated from the lower aluminum plate 30d by about λg'/2. Similarly, a center-to-center distance of the emission slots 31s between the first row and the second row and a center-to-center distance between the second row and the third row are about λg'/2. Thereby, the emission slots 31s and 31v can be arranged corresponding to the two or more magnetic field loops formed along the y-axis direction.

The distance in the x-axis direction from the center of the emission slots 31s at the first column to the short circuit surface 33 is about λg" (here, λg" is a guide wavelength within the emission waveguide 30 in the electromagnetic wave propagating direction). The introduction waveguide 20 is located at an intermediate position between the emission slots 31s and the short circuit surface 33. Thereby, the emission waveguide 30 is used as a progressive waveform type in the electromagnetic wave propagating direction (x-axis direction) and as a resonated type in a direction perpendicular to the electromagnetic wave propagating direction of the emission waveguide 30 (y-axis direction).

As shown in FIG. 4, the emission slots 31s are formed at the positions where they interrupt the tube wall current which occurs in the high order mode and flows in the y-axis direction. It can be seen that, on the side close to the radio wave absorber 34 (the side far from the introduction waveguide 20), the emission slots 31s are inclined alternately so that the directions of the emitted electric fields are directed in the same direction. That is, the arrangement of inclination of the emission slots 31s is designed so that the primary polarized wave planes of the emission electric fields, which couple to the electromagnetic waves in the high order mode within the waveguide space SS and are emitted from the emission slots 31s, are oriented horizontally, and the polarized wave components perpendicular to the primary polarized wave planes (vertical polarized waves) are cancelled out by each other. This inclination of the emission slots 31s is designed so that it becomes smaller as it separates from the center toward both ends (toward the introduction waveguide 20 and toward the radio wave absorber 34). The inclination of the emission slots 31s becomes larger as the angle with respect to the flow direction of the tube wall current interrupted by the emission slots 31s becomes larger. Therefore, the emission efficiency becomes higher, and when the angle of inclination of the emission slots 31s is 0, the electromagnetic wave emitting amount becomes about 0 because the tube wall current is hardly interrupted.

On the other hand, the emission slots 31v of each row are arranged, similar to the emission slots 31s, with respect to a straight line separated from the upper aluminum plate 30c, which is the short circuit surface, by the integral multiple of λg'/2. However, in the case of the emission slots 31v, since offsets d in the y-axis direction are given, the distances to the centers of the emission slots 31v from the upper aluminum plate 30c and the lower aluminum plate 30d, which are the short circuit surfaces, does not become exactly the integral multiples of λg'/2 unlike the emission slots 31s. The emission slots 31v are preferably formed at the positions where they interrupt the tube wall current produced in the high order mode and flows in the x-axis direction.

As for the offset d of the emission slots 31v, in order to direct the electric fields emitted from the emission slots 31v in the same direction, the pattern where the offset d is given toward the upper aluminum plate 30c and the pattern where the offset d is given toward the lower aluminum plate 30d are repeated alternately for every row of the emission slots 31v. By being arranged in this way, the primary polarized wave planes of the emission electric fields, which couple to the electromagnetic waves in the high order mode within the waveguide space SS and are emitted from the emission slots 31v, are oriented horizontally, and the polarized wave components perpendicular to the primary polarized wave planes (vertical polarized waves) are cancelled out by each other.

As shown in FIG. 4, the offset d of the emission slots 31v formed in the emission waveguide 30 is designed so that it becomes smaller as it separates from the center toward both ends (toward the introduction waveguide 20 and toward the radio wave absorber 34). As the offset d of the emission slots 31v becomes larger, the emission efficiency becomes higher because the tube wall current interrupted by the emission slots 31v becomes greater. Therefore, since the tube wall current is hardly interrupted when the offset d of the emission slots 31v is 0, the electromagnetic wave emitting amount becomes about 0.

As described above, by setting the inclination of the emission slots 31s and the offset d of the emission slots 31v, the emission intensity becomes the maximum at the center of the emission waveguide 30 in the longitudinal direction (x-axis direction). Thereby, the emission intensity distribution is set so that the emission intensity deceases gradually as it separates from the center. Therefore, a generation and intensity of side lobes can be suppressed.

Note that, although the electromagnetic wave propagating direction (x-axis direction) of the emission waveguide 30 is used for the progressive waveform type in the above example, the electromagnetic wave propagating direction (x-axis direction) may also be used for the resonated type. In such a case, the radio wave absorber 34 is not formed at the end of the emission waveguide 30 on the side separated from the introduction waveguide 20 and is used as the short circuit surface. In addition, the standing waves are generated by setting the distance from the short circuit surface to the nearest emission slots 31s in the electromagnetic wave propagating direction of the emission waveguide to about ½ of the guide wavelength λg" in the electromagnetic wave propagating direction within the emission waveguide 30. The distances to the emission slots 31s from the three-side short circuit surfaces (the upper aluminum plate 30c, the lower aluminum plate 30d, and the short circuit surface 33), respectively, are similar to those in the case of the progressive waveform.

The intervals of the columns of the emission slots 31s and 31v (an array pitch Ps in the x-axis direction) arranged as described above may be set to about ¼ of the guide wavelength λg" as shown in FIGS. 3 and 4, and may be set to about 12.5 mm as an example of the case where the operating frequency is 9.41 GHz.

(2-3) Configuration of Lattice

As shown in FIGS. 1 and 3, each metal wall 41 of the lattice 40 is made from a rectangular metal plate which is formed so that it extends in the y-axis direction along the columns Ln of the emission slots 31s and 31v and it extends in a direction perpendicular to the front aluminum plate 30a (z-axis direction). A thickness t1 of the metal walls 41 is 1 mm, for example. Moreover, each metal wall 41 is formed between respective columns of the emission slots 31s and 31v.

Preferably, a height H1 (FIG. 1) of the metal walls 41 (a dimension in the z-axis direction) is within a range of ½×0.8 to ½×1.2 of the wavelength of the operating frequency. If the operating frequency is 9.41 GHz, the height H1 of the metal walls 41 is about 13 to 19 mm. More preferably, it is ½×0.9 to ½×1.1 of the wavelength of the operating frequency and, in such a case, the height H1 is about 14 to 18 mm. Most preferably, it is ½ of the wavelength of the operating frequency and, in a case of 9.41 GHz, it is about 16 mm. If the metal base plate 42 is thick, the height H of the metal wall 41 is defined considering the thickness of the metal base plate 42. If the height H of the metal wall 41 is defined based on the upper surface of the metal base plate 42, it is determined so that the sum of the thickness of the metal base plate 42 and the height H of the metal wall 41 becomes ½ of the wavelength of the operating frequency. The height H1 of the metal walls 41 is set to a suitable value taking required performances and a manufacturing error in consideration.

If the operating frequency is 9.41 GHz, for example, the metal walls 41 project by a dimension ΔA from a width A of the emission waveguide 30 (a dimension in the y-axis direction), and ΔA=3 mm. Therefore, a width W of the metal walls 41 (a dimension in the y-axis direction) is given by (A+2ΔA), and is 94.8 mm. The interval between the adjacent metal walls 41 (an array pitch Pp in the x-axis direction) becomes about ¼ of the guide wavelength λg", as shown in FIG. 3, similar to the interval of the columns of the emission slots 31s and 31v (the array pitch Ps).

A number of metal walls 41 are fixed to the metal base plate 42. The metal walls 41 and the metal base plate 42 may be made integrally of aluminum by die-casting, or may be fabricated separately and then joined by welding or the like, for example. Thereby, sides 41a (refer to FIG. 1) of the metal walls 41 on the side of the front aluminum plate 30a are electrically coupled to the metal base plate 42. Openings 42a, through which the emission slots 31s and 31v are exposed, are formed in the metal base plate 42. Moreover, ribs 42b are formed along the long side of the metal base plate 42. The clips 50 are attached to the ribs 42b, respectively.

(2-4) Configuration of Clip and Assembly of Antenna

Figure 5A:
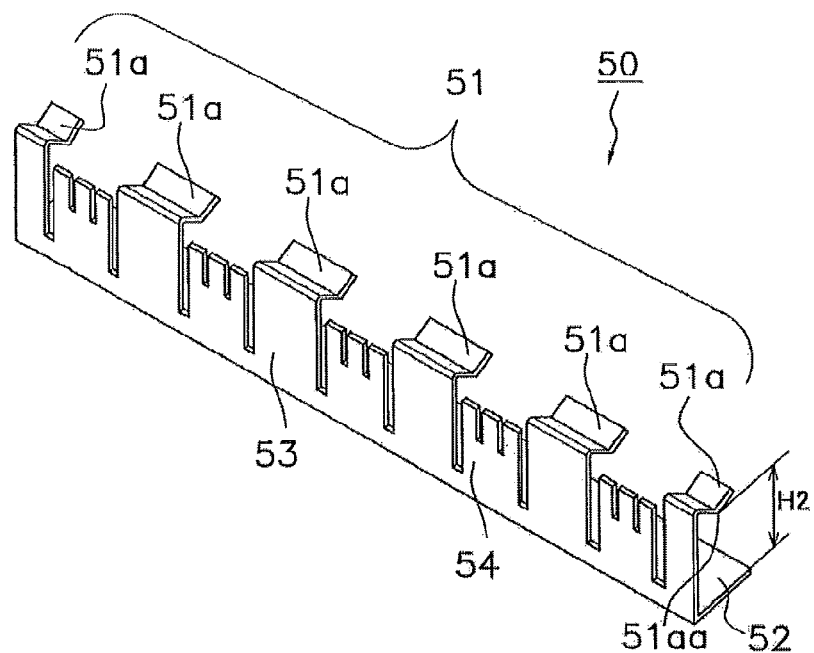
FIG. 5A is a perspective view showing a configuration of a clip of the slot array antenna of FIG. 1.
Figure 5B:
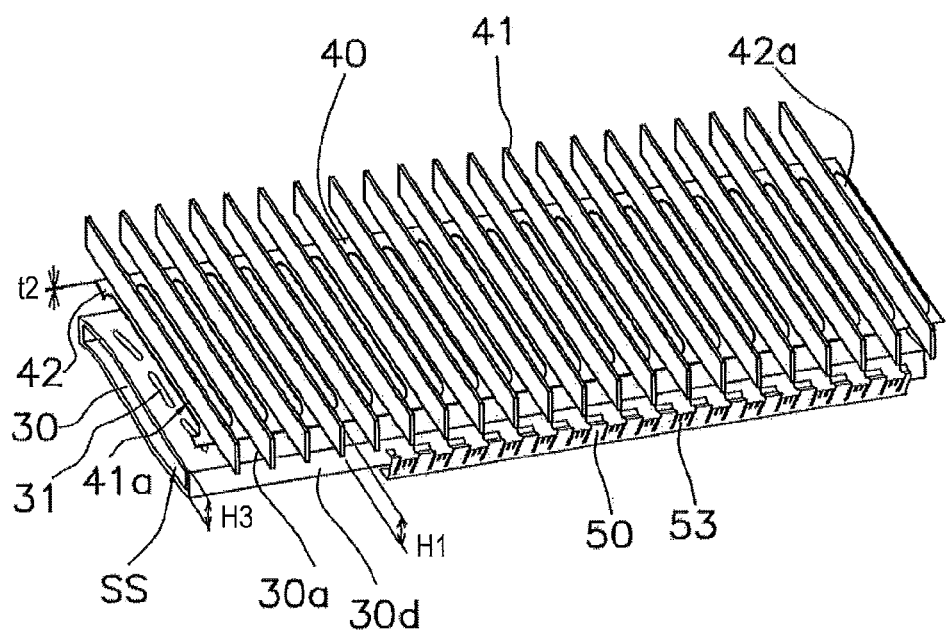
FIG. 5B is an exploded perspective view of the slot array antenna of FIG. 1.

FIG. 5A is a perspective view showing the structure of the clip 50, and FIG. 5B is an exploded view showing an assembly of the slot array antenna of this embodiment. The clip 50 has a configuration where a first blade part 51 and a second blade part 52 are connected together via an elastic part 53. The first blade part 51 is bent in a V-shape in cross section. A height H2 from a tip part 51aa of the V-shape of the first blade part 51 to the second blade part 52 is designed so that, in a state where the clip 50 pinches the emission waveguide 30 and the metal base plate 42 which are stacked one on the other, a force to cause the elastic part 53 to be curved and cause the metal base plate 42 to press against the emission waveguide 30 by the first blade part 51 and the second blade part 52 is generated. That is, in a state where no force act on the elastic part 53, a relation of [the height H2 of the clip 50 <(the height H3 of the emission waveguide 30+the thickness t2 of the metal base plate 42)] can be established.

The first blade part 51 and the elastic part 53 are formed in a comb shape, and they are designed so that teeth portions 51a of the first blade part 51 contacts the surface of the metal base plate 42. The clip 50 is also designed so that each metal wall 41 is arranged between two adjacent teeth portions 51a of the first blade part 51 when fastening the lattice 40 to the emission waveguide 30 with the clip 50.

Although only one clip 50 is shown in FIG. 5B, another clip 50 is hidden behind the lattice 40. These two clips 50 are attached from both sides of the emission waveguide 30, respectively. Protruded pieces 54 are formed in the clip 50, and each protruded piece 54 is located between the adjacent teeth portions 51a of the first blade part 51. The protruded pieces 54 cover, in a state where the clip 50 clips and fastens the lattice 40 to the emission waveguide 30, a boundary part where the emission waveguide 30 and the lattice 40 contact, and prevents the electromagnetic waves from leaking from the gap of the boundary part.

Each clip 50 is fitted onto the emission waveguide 30 and the lattice 40, which are stacked one on the other, by hooking the tip parts 51aa at the rib 42b of the metal base plate 42 of the lattice 40 and the clip 50 is then pushed further. Since the behavior of the clip 50 at this time is the same as that of a second embodiment described below, the behavior will be described referring to the accompanying drawings in the description of the second embodiment.

Second Embodiment (1) Entire Configuration

Figure 6:
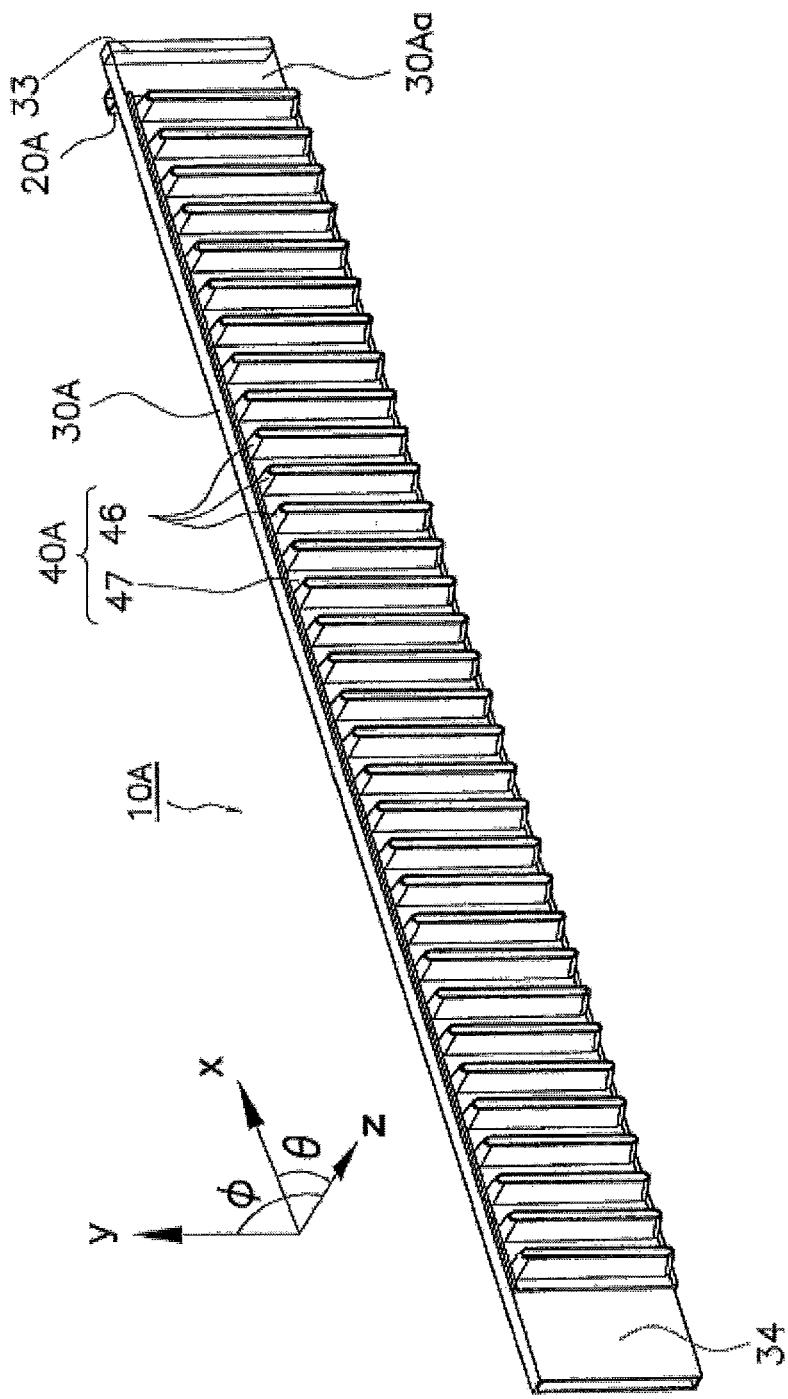
FIG. 6 is a perspective view of a slot array antenna according to a second embodiment of the invention.
Figure 7A:
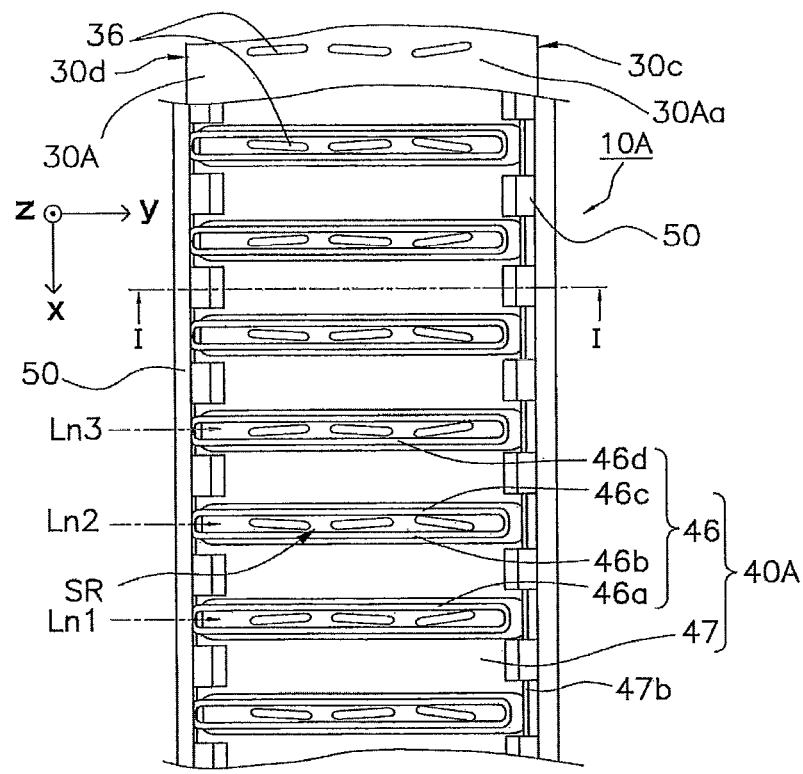
FIG. 7A is an elevational view showing a part of the slot array antenna shown in FIG. 6.
Figure 7B:
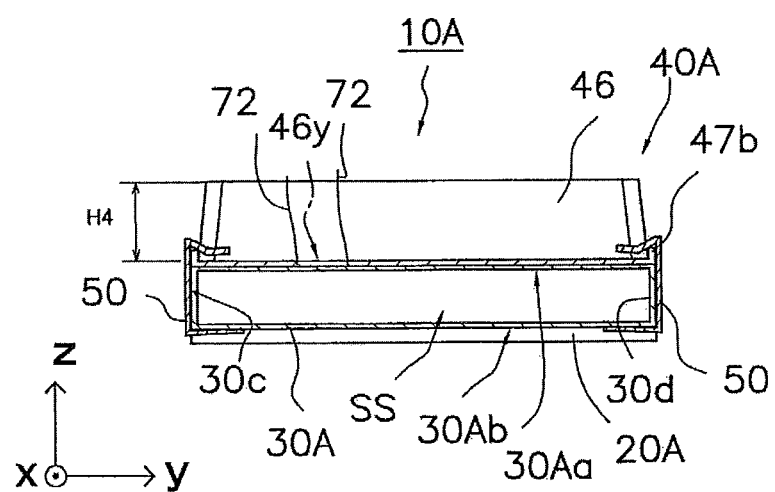
FIG. 7B is a cross-sectional view taken along a line I-I in FIG. 7A.

The entire configuration of a slot array antenna 10A according to a second embodiment of the present invention is described referring to FIGS. 6 and 7. FIG. 6 is a perspective view showing a general view of the slot array antenna 10A according to this embodiment. FIG. 7A is an elevational view showing a part of the slot array antenna 10A shown in FIG. 6, and FIG. 7B is a cross-sectional view taken along a line I-I of FIG. 7A.

The slot array antenna 10A shown in FIG. 6 mainly includes an introduction waveguide 20A, an emission waveguide 30A, a lattice 40A, and clips 50. As shown in FIG. 7A, emission slots 36 are arrayed vertically and horizontally in the emission waveguide 30A. The electromagnetic waves are emitted from the emission slots 36. The emitting direction of the electromagnetic waves from the emission slots 36 are in the z-axis direction, the electromagnetic wave propagating direction within the emission waveguide 30A is in the x-axis direction, and the electromagnetic wave propagating direction within the introduction waveguide 20A is in the y-axis direction.

The emission waveguide 30A is manufactured by punching and bending an aluminum plate. The emission waveguide 30A manufactured in this way is similar to the emission waveguide 30 of the first embodiment in that the emission waveguide 30A is a waveguide having a rectangular cross-section where four sides of the emission waveguide 30A are formed from rectangular aluminum plates. A number of emission slots 36 are formed in a front aluminum plate 30Aa of the emission waveguide 30A, where the slots 36 are arrayed in the y-axis direction (vertical direction) to form columns of the slots and arrayed in the x-axis direction (horizontal direction) to form rows of the slots. The back aluminum plate 30Ab is arranged in parallel to the front aluminum plate 30Aa. A radio wave absorber 34 is provided at one end of the emission waveguide 30A in the x-axis direction, and a short circuit surface 33 is formed at the other end. Moreover, the upper aluminum plate 30c and the lower aluminum plate 30d which are two sides of the waveguide 30A and which couple and support the front aluminum plate 30Aa and the back aluminum plate 30Ab also serve as short circuit surfaces. A space between the front aluminum plate 30Aa and the back aluminum plate 30Ab (i.e., a space surrounded by the front aluminum plate 30Aa, the back aluminum plate 30Ab, the upper aluminum plate 30c, and the lower aluminum plate 30d) serves as a waveguide space SS (FIG. 7B).

Figure 9A:
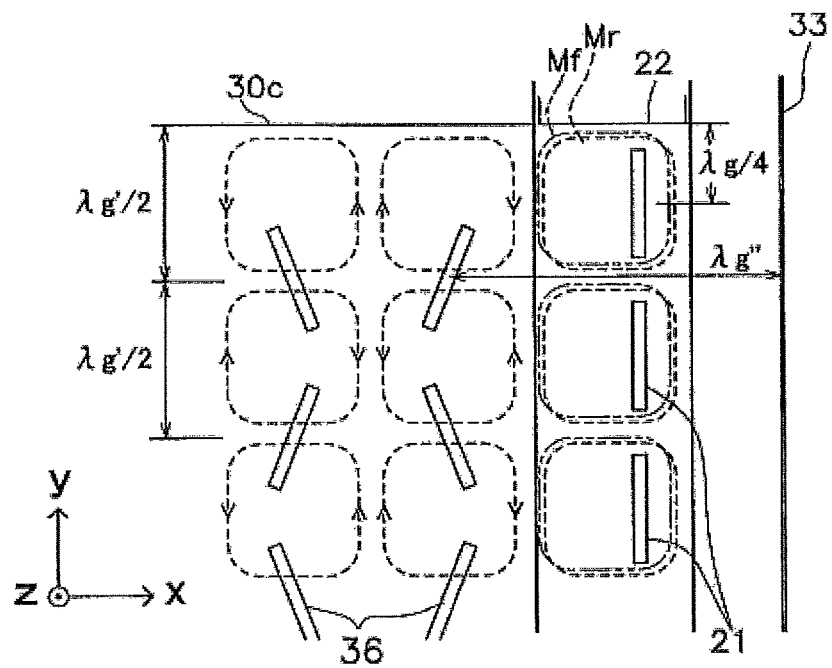
FIG. 9A is a view illustrating an example of emission of electromagnetic waves from the emission slots of the slot array antenna shown in FIG. 6.

The introduction waveguide 20A is similar to the introduction waveguide 20 of the first embodiment in that the waveguide 20A uses the back aluminum plate 30Ab of the emission waveguide 30A as one side thereof, made of an aluminum plate and formed by bending the aluminum plate into a gutter shape having a substantially rectangular cross section, and attached with screws so that the electromagnetic wave propagating direction is oriented in the y-axis direction. Introduction slots 21 of the introduction waveguide 20A are formed in the back aluminum plate 30Ab, and are arranged so that they are arrayed in line in the y-axis direction, as shown in FIG. 9A, described later.

The lattice 40A is fastened to the front side (positive side in the z-axis direction) of the front aluminum plate 30Aa of the emission waveguide 30A. The lattice 40A includes a number of metal walls 46 and a metal base plate 47 that couples and fixes to the metal walls 46. Although the detailed structure of the lattice 40A will be described later, a major point which differentiates the lattice 40A of the second embodiment from the lattice 40 of the first embodiment is the shape of the metal walls 46.

Since the configuration of the clips 50 is similar to that of the first embodiment, description thereof is omitted in this embodiment.

(2) Detailed Configuration (2-1) Arrangement of Introduction Slots

Two examples of the electromagnetic wave propagation mode within the introduction waveguide 20A are shown in FIGS. 8A and 9A, and FIGS. 8B and 9B. An excitation probe (not shown) is provided inside the introduction waveguide 20A of FIGS. 8A and 8B, and electric power is supplied to the excitation probe from the exterior through the coaxial connector (not shown). In order to obtain the electromagnetic wave propagation mode of FIGS. 8A and 8B, the introduction waveguide 20A is short-circuited at both ends or one end thereof with short circuit surfaces 22 and 27 and is used as the resonated type where standing waves are produced inside.

Figure 8A:
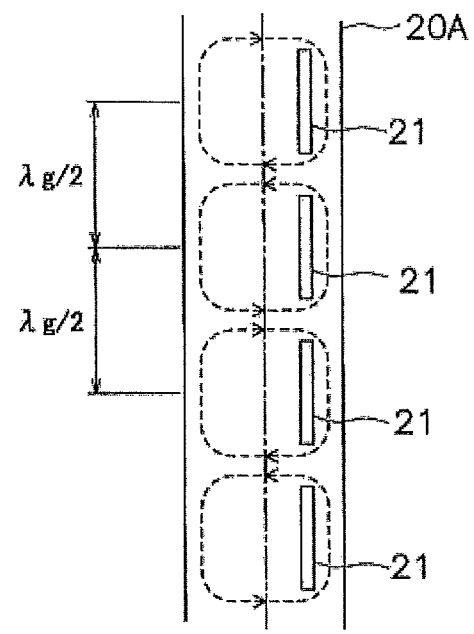
FIG. 8A is view showing an example of introduction slots of the slot array antenna shown in FIG. 6.

Since the arrangement of the introduction slots 21 in the example shown in FIGS. 8A and 9A is similar to that of the first embodiment, description of the arrangement of the introduction slots 21 is omitted in this embodiment.

Figure 8B:
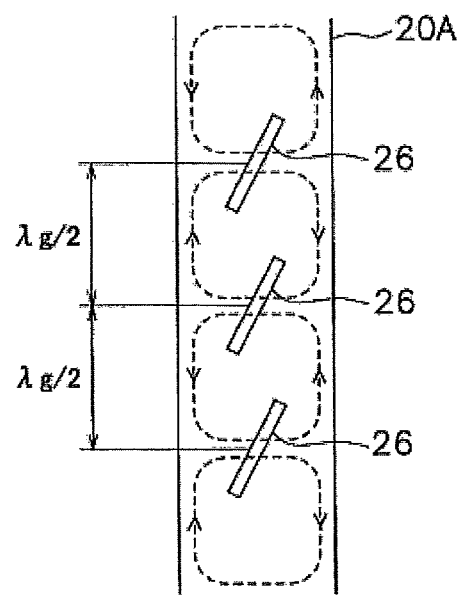
FIG. 8B is a view showing another example of the introduction slots of the slot array antenna shown in FIG. 6.
Figure 9B:
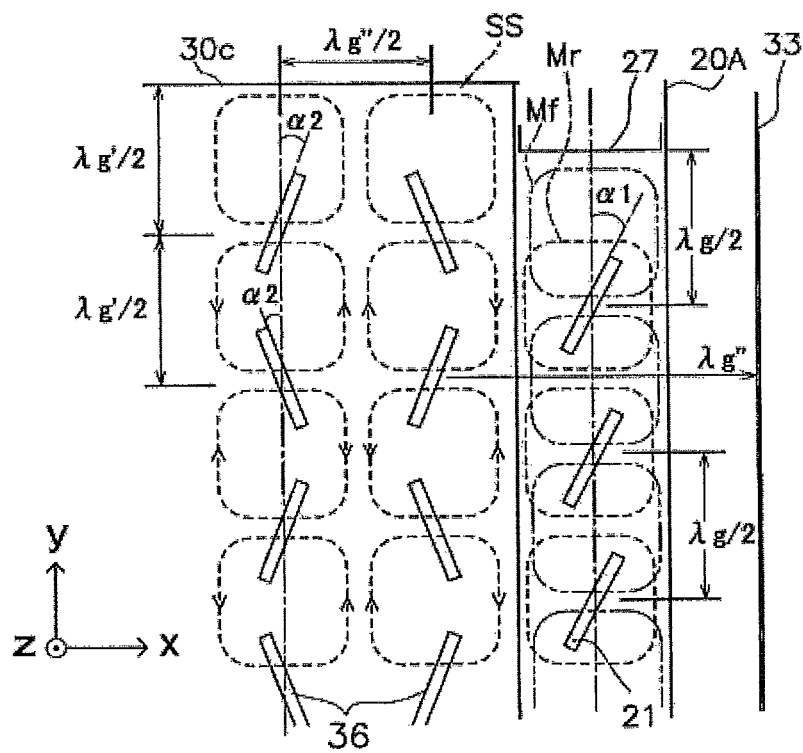
FIG. 9B is a view illustrating another example of the emission of electromagnetic waves from the emission slots of the slot array antenna shown in FIG. 6.

In the example shown in FIGS. 8B and 9B, the introduction slot 26 nearest to the short circuit surface 27 is arranged so that the distance from the center thereof to the short circuit surface 27 becomes an approximately integral multiple of $\lambda g/2$ (here, $\lambda g$ is a guide wavelength within the introduction waveguide 20A in the electromagnetic wave propagating direction). Here, in this embodiment, the introduction slot 26 is located so that the center of the slot 26 is separated from the short circuit surface 27 by $\lambda g/2$.

Three introduction slots 26 shown in FIG. 9B are arranged at a pitch of about half wavelength of the guide wavelength $\lambda g$ along the electromagnetic wave propagating direction of the introduction waveguide 20A (y-axis direction). In addition, in the elevational view, the introduction slots 26 are arranged so as to incline in the same direction by a specific angle $\alpha 1$ with respect to the axial center of the introduction waveguide 20. The introduction slots 26 thus arranged interrupt the tube wall current which flows in the y-axis direction, and electromagnetic waves of which electric fields Es are directed in a direction perpendicular to the respective introduction slots 26 are emitted from the introduction slots 26 into the emission waveguide 30A.

As described above, the introduction slots 26 are preferably arranged repeatedly at about every $\lambda g/2$ in order to direct the electric fields of the electromagnetic waves emitted from the introduction slots 26 alternately in the opposite directions, thereby propagating the electromagnetic waves in the TEn0 mode (high order mode of the TE mode) into the waveguide space SS. In this example, although the introduction slots 26 of the introduction waveguide 20A are repeatedly formed at every half wavelength of the guide wavelength $\lambda g$ in the electromagnetic wave propagating direction of the introduction waveguide 20A (y-axis direction), the introduction slots 26 may also be repeatedly formed at every integral multiple of the guide wavelength $\lambda g$. By forming the introduction slots 26 repeatedly at a pitch of about integral multiple of the guide wavelength $\lambda g$, the electromagnetic waves in a TEM mode can be produced within the emission waveguide 30A.

(2-2) Arrangement of Emission Slots

The slot array antenna 10A, similar to the slot array antenna 10, is also used being oriented so that, for example, the x-z plane is oriented horizontally, to emit the horizontal polarized waves from which the vertical polarized waves are suppressed. For this reason, the emission slots 36 are arranged so that the primary polarized wave planes of the emission electric fields couple to the electromagnetic waves in the high order mode and are oriented horizontally, and so that the polarized wave components (vertical polarized waves) perpendicular to the horizontal polarized waves are cancelled out by each other. In the following description, regarding the arrangement of the emission slots 36, an array of the slots in the x-axis direction is referred to as a "row," and an array of the slots in the y-axis direction is referred to as a "column." From the side close to the upper aluminum plate 30c, the rows are counted as a first row, a second row and so forth, and from the side close to the introduction waveguide 20, the columns are counted as a first column, a second column and so forth, similar to the previous embodiment.

A distance from the center of the emission slots 36 at the first row to the upper aluminum plate 30c (short circuit surface) is about ½ of the guide wavelength ($\lambda g'/2$) within the emission waveguide 30A in the direction perpendicular to the electromagnetic wave propagating direction. Similarly, a distance between the center of the emission slots 36 at the first row and the center of the emission slots 36 at the second row and a distance between the center of the emission slots 36 at the second row and the center of the emission slots 36 at the third row, i.e., the array pitch of the emission slots 36 are also about $\lambda g'/2$.

The distance in the x-axis direction from the emission slots 36 at the first column to the short circuit surface 33 becomes about $\lambda g''$ (here, $\lambda g''$ is a guide wavelength within the emission waveguide 30A in the electromagnetic wave propagating direction). The introduction waveguide 20A is located at the midpoint between the emission slots 36 and the short circuit surface 33. Therefore, the emission waveguide 30A is used as a progressive waveform type in the electromagnetic wave propagating direction (x-axis direction) and as a resonated type in a direction perpendicular to the electromagnetic wave propagating direction of the emission waveguide 30A (y-axis direction).

As shown in FIGS. 9A and 9B, the emission slots 36 are formed at locations where they interrupt the tube wall current which is generated in the high order mode and flows in the y-axis direction. That is, the emission slots 36 are inclined alternately by a specific angle $\alpha 2$ with respect to the y-axis direction so that the directions of the electric fields emitted are directed in the same direction. In other words, the inclination of the emission slots 36 are set such that the primary polarized wave planes of the emission electric fields, which couple to the electromagnetic waves in the high order mode within the waveguide space SS and are emitted from the emission slots 36, are oriented horizontally, and the polarized wave components perpendicular to the primary polarized wave planes (vertical polarized waves) are cancelled out by each other.

The interval of the columns of the emission slots 36 (the array pitch Ps in the x-axis direction) arranged as described above is about ½ of the guide wavelength $\lambda g''$, as shown in FIGS. 9A and 9B.

(2-3) Configuration of Lattice

As shown in FIG. 7A, two metal walls 46a and 46b among a number of metal walls 46 of the lattice 40A are arranged between the adjacent two columns Ln1 and Ln2 of the emission slots 36. Similarly, two metal walls 46c and 46d are arranged between the adjacent two columns Ln2 and Ln3 of the emission slots 36. As described above, two metal walls 46 are arranged between two adjacent columns of the emission slots 36.

If two metal walls 46b and 46c on both sides of the column Ln2 of the emission slots 36 are seen among the many metal walls 46 arranged in such a way, the two metal walls 46b and 46c are designed so that they are coupled to the upper aluminum plate 30c and the lower aluminum plate 30d at locations near the aluminum plates 30c and 30d, and surround a space SR of the column Ln2 of the emission slots 36 on the electromagnetic wave emission side. Thus, the wall including the metal walls 46b and 46c which surrounds the space SR forms a shape like a chimney standing on the column of the emission slots 36. This chimney-shaped wall is designed so that the metal walls 46c and 46d stand inclined so that the distance between the metal walls 46b and 46c is smaller as it separates from the metal base plate 47 (i.e., tapered narrower in the chimney height direction). The cross-sectional shape of the metal wall 46 is described referring to a cross-sectional view in the following third embodiment.

A desirable height of the metal walls 46 (a dimension in the z-axis direction) is similar to that of the metal walls 41 of the first embodiment. When the metal base plate 47 is thick, a height H4 of the metal walls 46 is defined considering the thickness of the metal base plate 47. If the height H4 of the metal walls 46 is defined from the upper surface of the metal base plate 47, the sum of the thickness of the metal base plate 47 and the height H4 of the metal walls 46 is defined to be about ½ of the wavelength of the operating frequency, for example.

The metal walls 46 and the metal base plate 47 are formed integrally by aluminum die-cast or are fabricated separately and then joined by welding or the like, for example. Thereby, sides 46y (bottom face, refer to FIG. 7B) of the metal walls 46 on the side of the front aluminum plate 30Aa are electrically coupled to the metal base plate 47 (i.e., the metal walls 46 and the metal base plate 47 are integrally formed). Note that a location shown by the reference numerals 72 in FIG. 7B is a boundary of a partially-removed portion. Moreover, the ribs 47b are formed along the long sides of the metal base plate 47. Clips 50 are attached to the ribs 47b, respectively.

(2-4) Assembly of Antenna

Figure 10A:
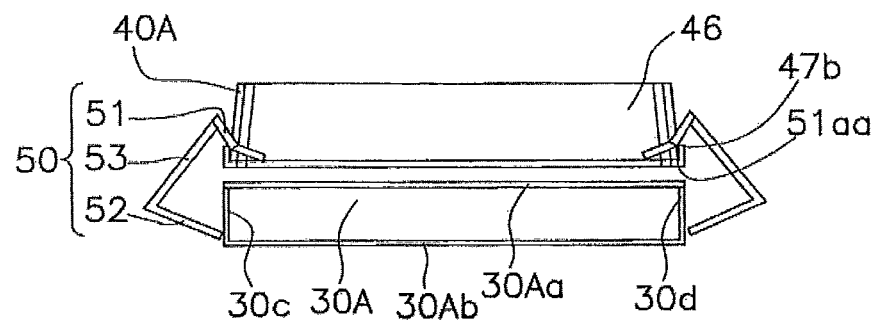
FIG. 10A is a schematic diagram showing one process of assembly of the slot array antenna shown in FIG. 6.
Figure 10B:
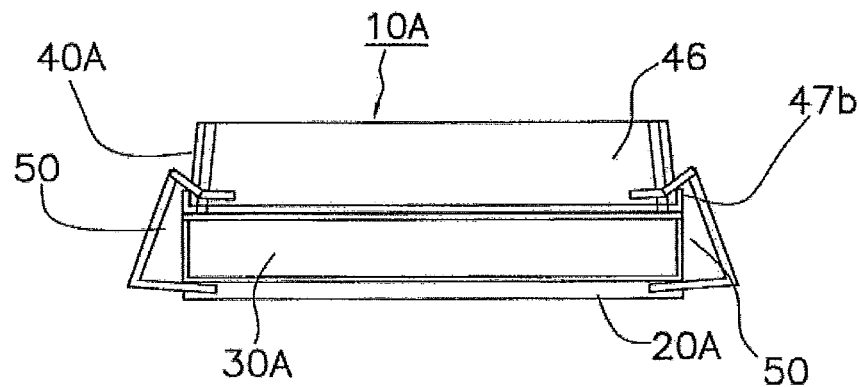
FIG. 10B is a schematic diagram showing another process of the assembly of the slot array antenna shown in FIG. 6.
Figure 10C:
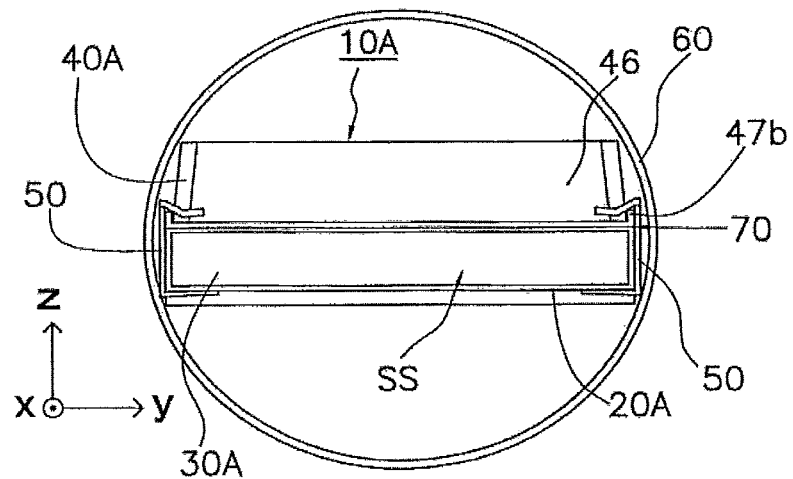
FIG. 10C is a schematic diagram showing still another process of the assembly of the slot array antenna shown in FIG. 6.

FIGS. 10A, 10B and 10C are schematic diagrams showing one process of assembly of the slot array antenna, respectively. Note that this embodiment is similar to the first embodiment in that the elastic part 53 of the clip 50 is bent when the clip 50 is fitted, and the first blade part 52 and the second blade part 52 of the clip 50 pinch the emission waveguide 30A and the metal base plate 47 by a force caused by the elastic deformation of the elastic part 53.

As shown in FIG. 10A, when fitting the clips 50, the metal base plate 47 (FIG. 7A) of the lattice 40A is first stacked onto the emission waveguide 30A. Although not illustrated in the figure, at this time, convex portions of the front aluminum plate 30Aa fit into concave portions (or holes) of the metal base plate 47 to align the front aluminum plate 30Aa with the metal base plate 47. That is, it is designed so that, in the state where the convex portions of the front aluminum plate 30Aa are engaged with the concave portions of the metal base plate 47, the lattice 40A does not move along the surface of the front aluminum plate 30Aa. As shown in FIG. 10A, the tip parts 51aa of the first blade part 51 of each clip 50 are forced to contact the rib 47b of the lattice 40A.

Next, as shown in FIG. 10B, while maintaining the state where the tip parts 51aa contact the rib 47b, the surface of the second blade part 52 is forced to contact near the corresponding long side of the back aluminum plate 30Ab of the emission waveguide 30A. Then, the clip 50 is pushed, while extending the gap between the second blade part 52 and the first blade part 51.

In the state where the clip 50 is fitted completely, as shown in FIG. 10C, much portions of the surface of the second blade part 52 of the clip 50 contact the back aluminum plate 30Ab. In this state, the bending of the elastic part 53 is somewhat smaller, compared with the bending thereof during the process of pushing the clip 50 (i.e., the clip 50 is a snap-in type clip). For this reason, even if someone try to remove the snapped-in clip 50, it is difficult to remove the clip 50 because of the resultant force including a frictional force between the second blade part 52 and the back aluminum plate 30Ab, and a force required to bend the elastic part 53 again to open wide. Moreover, after the clip 50 is snapped in, the clip 50 is also difficult to remove because the tip part 51aa of the first blade part 51 catch the rib 47b. At this time, since the protruded piece 54 (refer to FIG. 5A) covers the boundary part 70 between the lattice 40A and the emission waveguide 30, the leak of electromagnetic waves can be prevented.

Further, the slot array antenna 10A assembled by being fastened with the clips 50 is housed in the antenna case 60, as shown in FIG. 10C. This antenna case 60 has an inner diameter so as to contact the slot array antenna 10A in a state where it stores the slot array antenna 10A, thereby, the slot array antenna 10A does not move radially. Therefore, the clips 50 of the slot array antenna 10A, which is stored in the antenna case 60, contact the antenna case 60, and the clips 50 are thus impossible to be removed.

(3) Gap Between Lattice and Waveguide, and Influence of Screws

Figure 11:
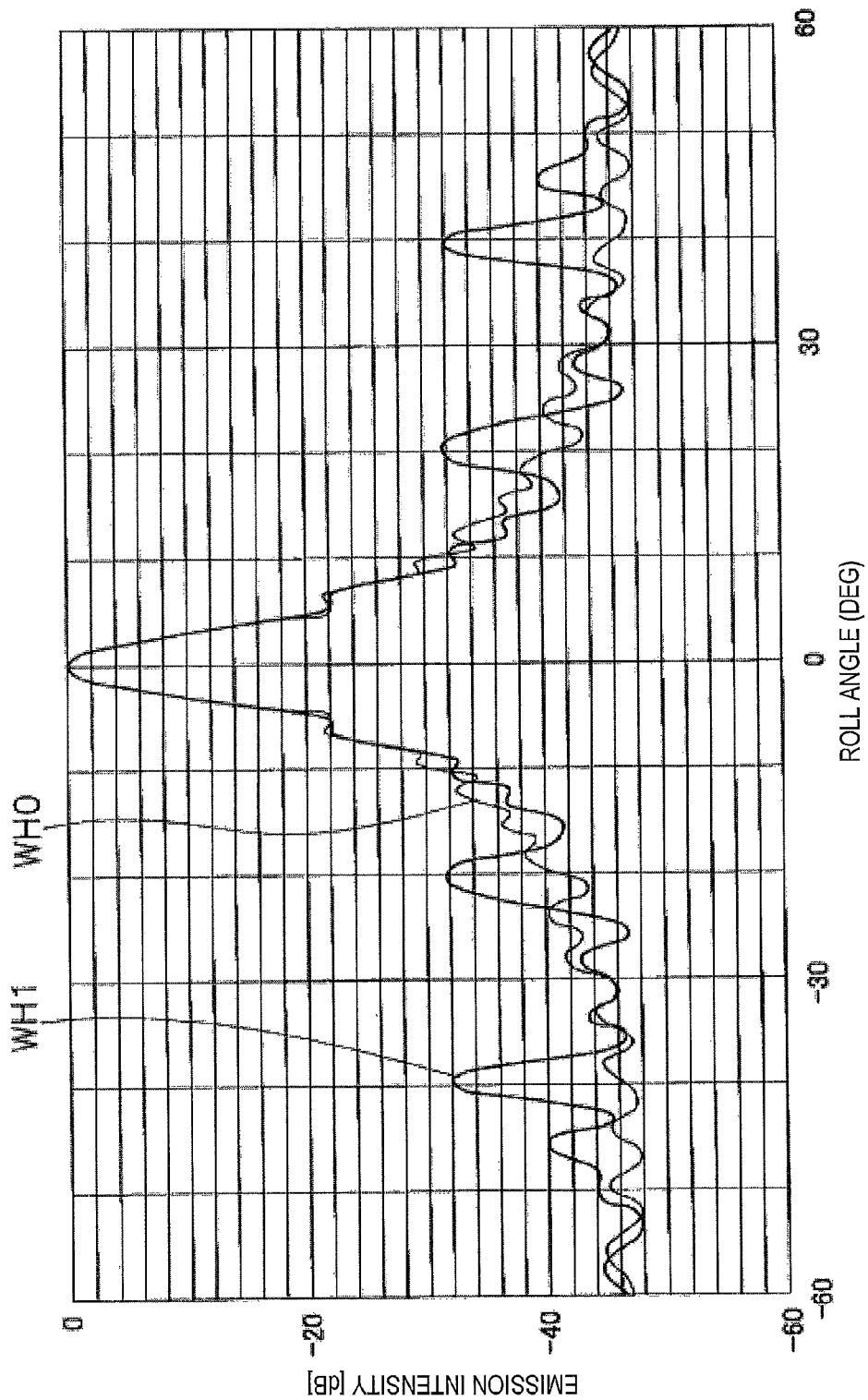
FIG. 11 is a chart illustrating an influence of a gap between an emission waveguide and a lattice.

FIG. 11 is a chart illustrating the influence of a gap between the emission waveguide and the lattice. FIG. 11 shows a graph which is plotted based on a simulation result of a case where the gap of about 1 mm is formed experimentally between the emission waveguide 30A and the lattice 40A, and a case where no gap is formed. The line indicated by reference characters WH0 shows an emission intensity of the horizontal polarized waves when no gap is formed and the line indicated by reference characters WH1 shows an emission intensity of the horizontal polarized waves when the gap of 1 mm is formed. When the gap of about 1 mm is formed, an increase in side lobes can be seen at roll angles 74 ±20 and ±40°. That is, it is understood that the effect of suppressing the side lobes is diminished by the arrangement of the emission slots 36 and the introduction slots 21 and 26 of the slot array antenna 10A and the effect caused by providing the lattice 40A. Although it is very rare that the 1-mm gap is formed in an actual use situation, it is understood from the result shown in FIG. 11 that even a small gap induces the bad influence on the effect of reducing the side lobes. Therefore, it is effective to fasten the lattice 40A to the emission waveguide 30A with the clips 50 so that substantially no gap is created between the emission waveguide 30A and the lattice 40A.

Figure 12A:
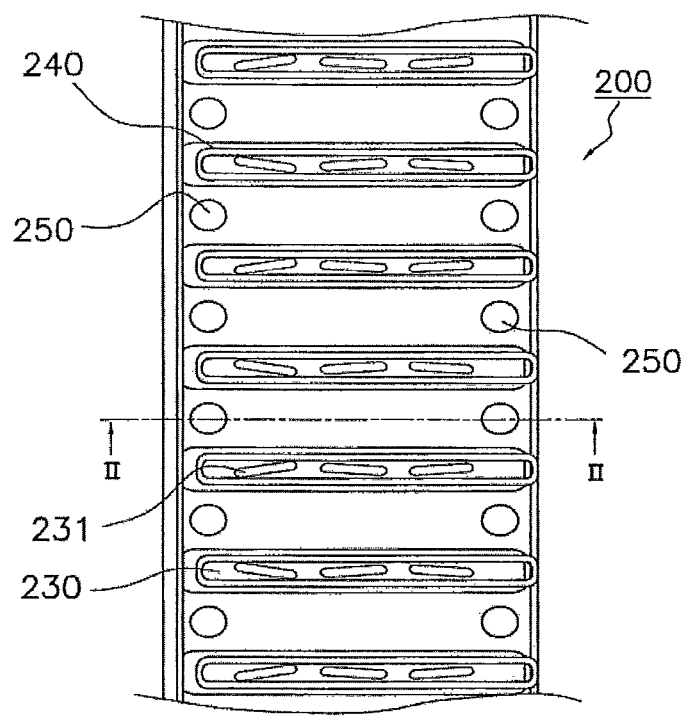
FIG. 12A is an elevational view showing a part of the slot array antenna where screws are used as fasteners.
Figure 12B:
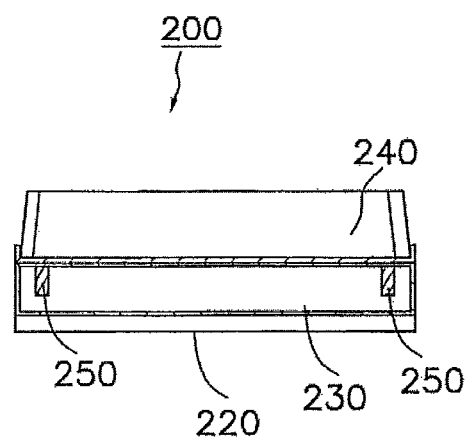
FIG. 12B is a cross-sectional view taken along a line II-II in FIG. 12A.

FIG. 12A is an elevational view of another slot array antenna 200 in which the lattice is fastened to the emission waveguide with screws, and FIG. 12B is a cross-sectional view taken along a line II-II of FIG. 12A. The slot array antenna 200 shown in FIGS. 12A and 12B is a modification of this embodiment, where it includes an introduction waveguide 220, an emission waveguide 230, and a lattice 240, similar to the slot array antenna 10A of this embodiment. This slot array antenna 200 differs from the slot array antenna 10A in that the lattice 240 is fastened with screws 250. Therefore, although screw holes through which the screws 250 are inserted are formed in the emission waveguide 230 and the lattice 240, other than that, the configuration of the emission waveguide 230 and the lattice 240 is the same as the emission waveguide 30A and the lattice 40A of this embodiment.

In the slot array antenna 200 using such screws 250, since disorder occurs on the electromagnetic waves within the emission waveguide 230 compared with the slot array antenna 10A using the clips 50. Therefore, side lobes of the electromagnetic waves emitted from emission slots 231 of the slot array antenna 200 becomes greater.

Figure 13:
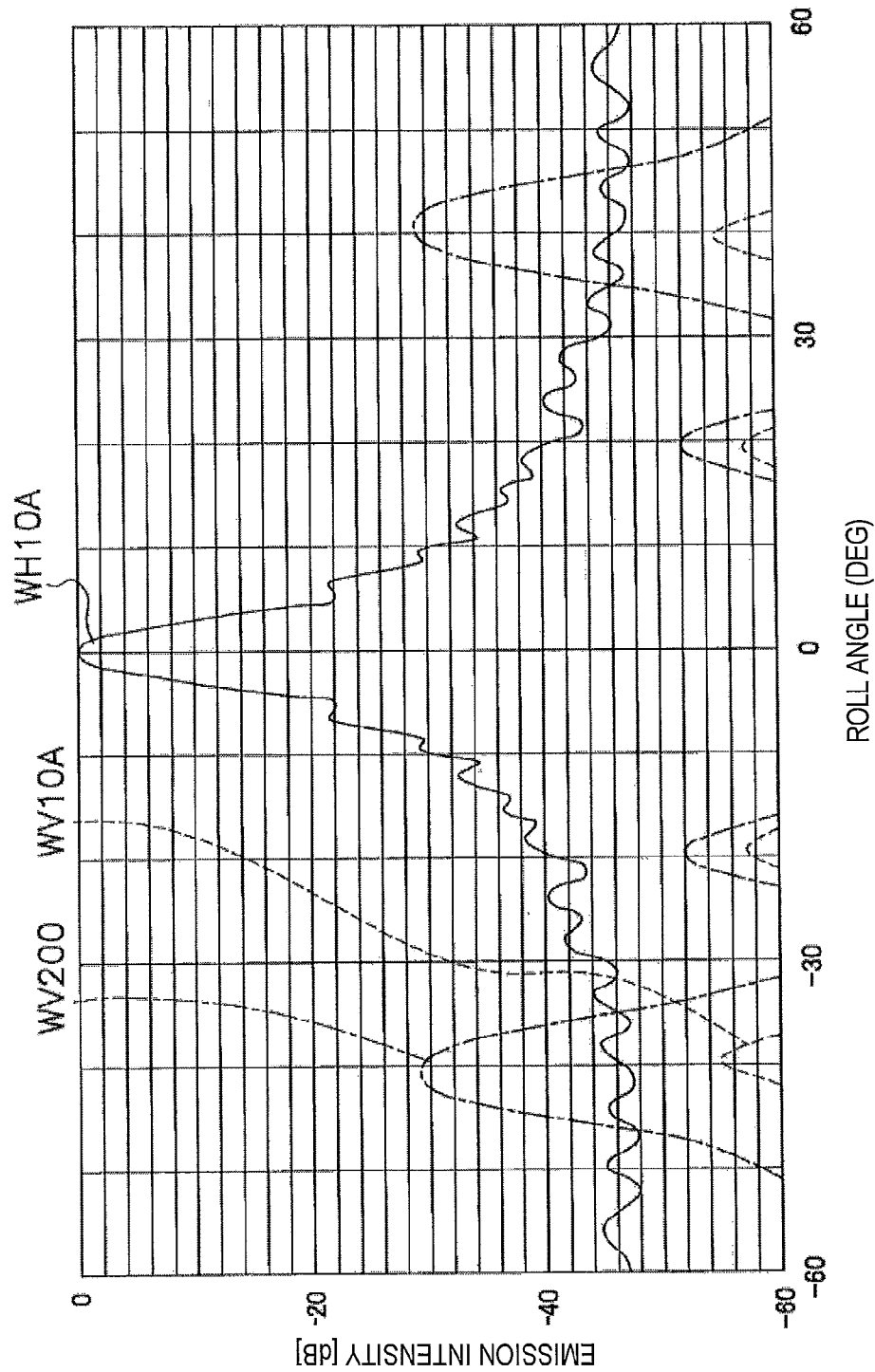
FIG. 13 is a chart illustrating an influence of the screws due to vertical polarized wave.

FIG. 13 is a chart showing an emission intensity of the horizontal polarized waves of the slot array antenna 1 OA and emission intensities of the vertical polarized waves of the slot array antennas 10A and 200. This graph schematically depicts the emission intensities of respective polarized waves based on simulation results, in order to facilitate the description. In the graph of FIG. 13, the line indicated by reference characters WV200 represents the emission intensity of the vertical polarized waves of the slot array antenna 200, the line indicated by reference characters WH10A represents the emission intensity of the horizontal polarized waves of the slot array antenna 10A, and the line indicated by reference characters WV10A represents the emission intensity of the vertical polarized waves of the slot array antenna 10A. Note that illustration of the emission intensity of the horizontal polarized waves of the slot array antenna 200 is omitted, in order to make the graph legible. It can be understood from FIG. 13 that, since the electromagnetic waves within the emission waveguide 230 are disordered due to the screws 250, the vertical polarized waves of the slot array antenna 200 with the screw fastening indicated by reference characters WV200 is large.

Third Embodiment (1) Entire Configuration

Figure 14:
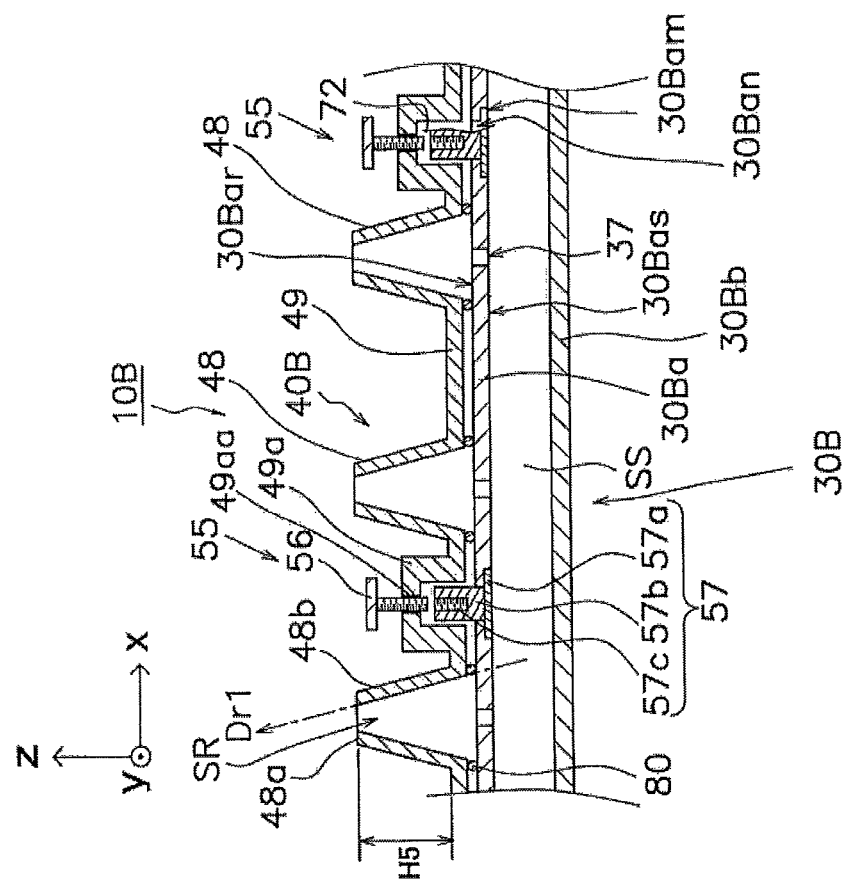
FIG. 14 is a cross-sectional view of a slot array antenna according to a third embodiment of the invention.

The entire configuration of a slot array antenna 10B according to a third embodiment of the present invention is described referring to FIG. 14. FIG. 14 is a partial cross-sectional view illustrating the appearance of the slot array antenna 10B according to this embodiment. FIG. 14 shows a part of the slot array antenna 10B in the x-axis direction but an introduction waveguide of the slot array antenna 10B is not illustrated. Since the configuration of the introduction waveguide of the slot array antenna 10B shown in FIG. 14 is the same as the configuration of the introduction waveguide 20A of the slot array antenna 10A of the second embodiment, description and illustration thereof are omitted in this embodiment.

The slot array antenna 10B according to this embodiment also includes, similar to the slot array antenna 10A of the second embodiment, an emission waveguide 30B and a lattice 40B. In addition, the slot array antenna 10B includes screw fastening members 55 as fasteners for fastening the lattice 40B to the emission waveguide 30B, instead of the clips 50 of the slot array antenna 10A.

Similar to the emission slots 36 of the slot array antenna 10A, the emission slots 37 of the slot array antenna 10B are arrayed vertically and horizontally. The spatial relationship of the emission slots 37 is completely the same as the spatial relationship of the emission slots 36.

The emission waveguide 30B is manufactured by punching and bending an aluminum plate and the back aluminum plate 30Bb is arranged in parallel to the front aluminum plate 30Ba, similar to the emission waveguide 30A. A space sandwiched between the front aluminum plate 30Ba and the back aluminum plate 30Bb is a waveguide space SS. Note that, although not illustrated in FIG. 14, the emission waveguide 30B also has a structure corresponding to the upper aluminum plate 30c and the lower aluminum plate 30d which are short circuit surfaces for supporting the front aluminum plate 30Ba and the back aluminum plate 30Bb, as well as the short circuit surface 33 and the radio wave absorber 34.

The front aluminum plate 30Ba has a waveguide space side principal surface 30Bas which faces the waveguide space SS, and an emission side principal surface 30Bar which faces the space SR on the electromagnetic wave emission side. As will be appreciated from the circumference of one of the screw fastening members 55 on the right end of FIG. 14 where a part thereof is cut out, a concave portion 30Bam is formed in the waveguide space side principal surface 30Bas. In order to reduce the disorder of electromagnetic waves as much as possible, the concave portions 30Bam are preferably arranged at positions corresponding to nodes of the electromagnetic waves and nodes of the tube wall current. An aperture part 30Ban continues from a part of the concave portion 30Bam to an emission side principal surface 30Bar.

The lattice 40B is fastened to the front side (positive side in the z-axis direction) of the front aluminum plate 30Ba of the emission waveguide 30B. The lattice 40B includes a number of metal walls 48 and a metal base plate 49 to which metal walls 48 are coupled and fixed. The lattice 40B differs from the lattice 40A of the second embodiment in that it includes attaching parts 49a to which the screw fastening members 55 are attached. The attaching parts 49a are formed between two adjacent metal walls 48 (between two adjacent columns of the emission slots 37). Although not illustrated in FIG. 14, two or more attaching parts 49a are arrayed in the y-axis direction.

Each of the screw fastening members 55 includes a male screw 56 and a cell spacer 57 with which the male screw 56 threadedly engages. The cell spacer 57 includes a wide part 57a and a narrow part 57b extended from the wide part 57a. A female threaded part 57c is threaded from an end face of the narrow part 57b which is located opposite from the wide part 57a.

The slot array antenna 10B additionally includes a configuration which does not exist in the slot array antenna 10A. That is, an electrically conductive member 80, such as an electrically conductive cloth, is arranged in the slot array antenna 10B, between the front aluminum plate 30Ba of the emission waveguide 30B and the metal base plate 49 of the lattice 40B. The electrically conductive member 80 is pinched and squeezed between the front aluminum plate 30Ba and the metal base plate 49, and deforms conforming to the shapes of the front aluminum plate 30B and the metal base plate 49. Therefore, the electrically conductive member 80 fills the gap between the front aluminum plate 30Ba and the metal base plate 49 to prevent the electromagnetic waves which exit the emission slots 37 from leaking from the gap.

(2) Detailed Configuration

(2-1) Arrangement of Introduction Slots

As described above, since the configuration of the introduction waveguide and the introduction slots of the slot array antenna 10B is the same as the slot array antenna 10A of the second embodiment, detailed description of the introduction waveguide and the introduction slots of the slot array antenna 10B is omitted in this embodiment.

(2-2) Arrangement of Emission Slots

As described above, the configuration of the emission waveguide 30B of the slot array antenna 10B is the same as the emission waveguide 30A of the second embodiment except for the concave portions 30Bam and the aperture parts 30Ban. Since the geometry of the emission slots 37 in the emission waveguide 30B is the same as the geometry of the emission slots 36 in the emission waveguide 30A, detailed description of the emission waveguide 30B and the emission slots 37 of the slot array antenna 10B is also omitted in this embodiment.

(2-3) Configuration of Lattice

As shown in FIG. 14, it is the same as the second embodiment that two of the metal walls 46 of the lattice 40B are arranged between two adjacent columns of the emission slots 37. For example, similar to the two metal walls 46b and 46c or the like, two metal walls 48a and 48b are formed on both sides of one column of the emission slots 37 and are coupled to each other. In addition, the metal wall including the two metal walls 48a and 48b, similar to the second embodiment, is formed in a chimney-like shape so that they surround the space SR on the electromagnetic wave emission side.

As shown in FIG. 14, the distance between the two metal walls 48a and 48b becomes smaller as it separates from the front aluminum plate 30Ba. Thus, even if the metal walls 48a and 48b of the lattice 40B are thus inclined, the effect of suppressing the vertical polarized waves can still be acquired. As for the metal wall 48b as an example, it is preferably formed in a planer shape extending in a direction Dr1 intersecting with the front aluminum plate 30Ba and extending in the y-axis direction. Therefore, it is not necessary to stand perpendicular to the waveguide space side principal surface 30Bas of the front aluminum plate 30Ba. Note that, the connection of the metal walls 48 with the metal base plate 49 can be achieved similarly to the metal walls 46 and the metal base plate 47 of the second embodiment.

Since the electrically conductive member 80 is located between the emission waveguide 30B and the lattice 40B, a height H5 of the metal walls 48 is defined taking the thickness of the electrically conductive member 80 into consideration. If the height H5 of the metal walls 48 is defined from the upper surface of the metal base plate 49, it is determined similarly to the first embodiment so that the sum of the thickness of the metal base plate 49, the height H5 of the metal walls 48, and the thickness of the electrically conductive member 80 is about ½ of the wavelength of the operating frequency, for example.

Each of the attaching parts 49a of the lattice 40B has an aperture part 49aa so that the male screw 56 of the screw fastening member 55 is attached. Moreover, the attaching part 49a bulges to the opposite side from the front aluminum plate 30Ba for the purpose of forming a space where the cell spacer 57 is attached.

(2-4) Configuration of Screw Fastening Members

In the elevational view, the shape of the wide part 57a is substantially in agreement with the shape of the concave portion 30Bam. As been appreciated from the cross-sectional shape, in the state where the wide part 57a is fitted into the concave portion 30Bam, the surface of the wide part 57a on the side of the waveguide space SS forms the same surface as the waveguide space side principal surface 30Bas of the front aluminum plate 30Ba, and, thereby preventing the disorder of the electromagnetic waves of the waveguide space SS.

As for the screw fastening members 55, in order to tightly fasten the lattice 40B, the height from the emission side principal surface 30Bar to the end surface of the narrow part 57b where the female threaded part 57c is formed is designed considering the state where the wide part 57a fits into the concave portion 30Bam. That is, the height up to the end surface of the narrow part 57b is set so that it is located at a position slightly lower than the surface of the attaching part 49a on the side of the emission waveguide 30B in the state where the emission waveguide 30B, the electrically conductive member 80, and the lattice 40B are stacked. Thereby, the lattice 40B can be firmly fastened to the emission waveguide 30B by threadedly engaging the male screws 56 with the female threaded parts 57c.

Fourth Embodiment

(1) Entire Configuration

Figure 15A:
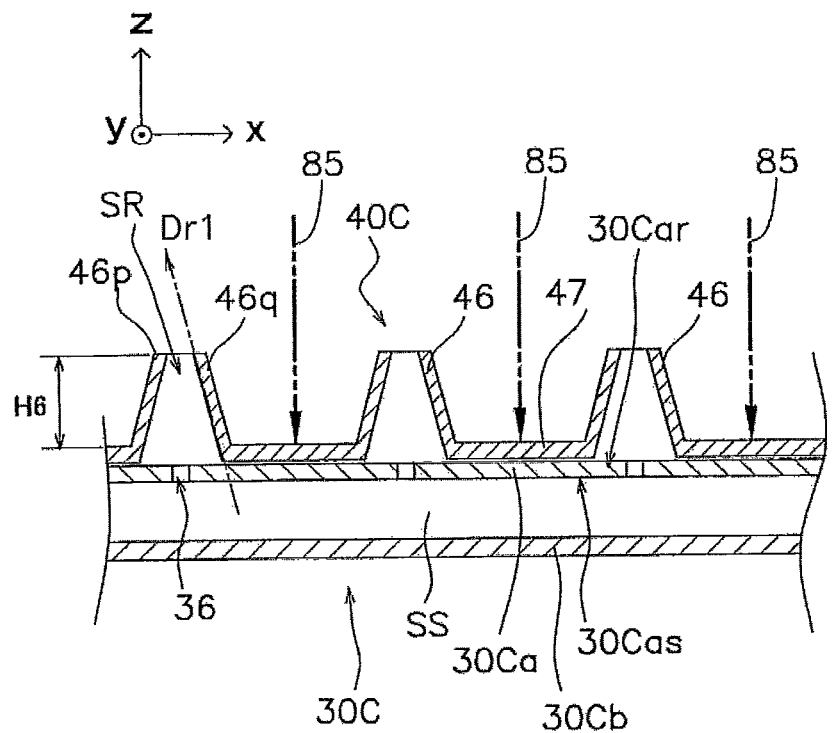
FIG. 15A is a cross-sectional view showing a manufacturing process of a slot array antenna according to a fourth embodiment of the invention.
Figure 15B:
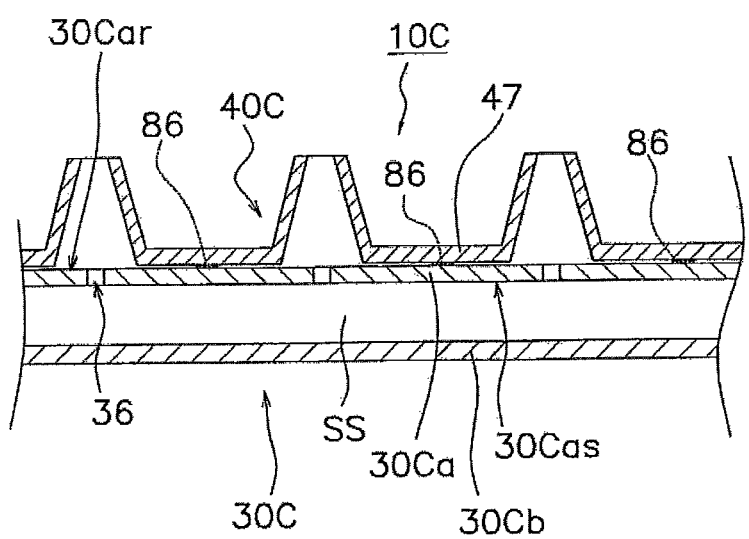
FIG. 15B is a cross-sectional view of the slot array antenna according to the fourth embodiment.

The entire configuration of a slot array antenna 10C according to a fourth embodiment of the present invention is described referring to FIGS. 15A and 15B. FIG. 15B is a cross-sectional view partially illustrating the appearance of the slot array antenna 10C, and FIG. 15A is a cross-sectional view showing one process of manufacturing the slot array antenna of FIG. 15B. FIGS. 15A and 15B show a part of the slot array antenna 10C in the x-axis direction, and does not illustrate an introduction waveguide of the slot array antenna 10C. Since the configuration of the introduction waveguide of the slot array antenna 10C is the same as the configuration of the introduction waveguide 20A of the slot array antenna 10A of the second embodiment, description and illustration thereof are omitted in this embodiment.

The slot array antenna 10C of this embodiment includes an emission waveguide 30C and a lattice 40C, similar to the slot array antenna 10A of the second embodiment. Moreover, emission slots 36 of the slot array antenna 10C are also arrayed vertically and horizontally, similar to the emission slots 36 of the slot array antenna 10A.

The emission waveguide 30C, similar to the emission waveguide 30A, is manufactured by punching and bending an aluminum plate, and a back aluminum plate 30Cb is arranged in parallel to a front aluminum plate 30Ca. An internal space of the emission waveguide 30C sandwiched between the front aluminum plate 30Ca and the back aluminum plate 30Cb is a waveguide space SS. Note that, although not illustrated in FIGS. 15A and 15B, the emission waveguide 30C also includes a configuration corresponding to the upper aluminum plate 30c and the lower aluminum plate 30d which are short circuit surfaces for supporting the front aluminum plate 30Ca and the back aluminum plate 30Cb, as well as the short circuit surface 33, and the radio wave absorber 34.

The front aluminum plate 30Ca has a waveguide space side principal surface 30Cas that faces the waveguide space SS, and an emission side principal surface 30Car that faces the space SR on the electromagnetic wave emission side. The lattice 40C is fastened to the emission side principal surface 30Car of the front aluminum plate 30Ca of the emission waveguide 30C by laser welding. The lattice 40C includes a number of metal walls 46 and a metal base plate 47 to which the metal walls 46 are coupled and fixed.

(2) Detailed Configuration (2-1) Arrangement of Introduction Slots

As described above, since the configuration of the introduction waveguide and the introduction slots of the slot array antenna 10C is the same as the slot array antenna 10A of the second embodiment, the detailed description of the introduction waveguide and the introduction slots of the slot array antenna 10C is omitted in this embodiment.

(2-2) Arrangement of Emission Slots

As described above, the configuration of the emission waveguide 30C of the slot array antenna 10C is the same as the emission waveguide 30A of the second embodiment. Since the geometry of the emission slots 36 in the emission waveguide 30C is the same as the geometry of the emission slots 36 in the emission waveguide 30A, detailed description of the emission waveguide 30C and the emission slots 36 of the slot array antenna 10C is also omitted in this embodiment.

(2-3) Configuration of Lattice

As shown in FIGS. 15A and 15B, it is the same as the second embodiment in that two of the metal walls 46 of the lattice 40C are arranged between two adjacent columns of the emission slots 36. For example, similar to the two metal walls 46b and 46c, two metal walls 46p and 46q are provided on both sides of one column of the emission slots 36 and connected with each other. The metal wall including the two metal walls 46p and 46q, similar to the second embodiment, is formed in a chimney-like shape so as to surround the space SR on the electromagnetic wave emission side. Moreover, the distance between the two metal walls 46p and 46q becomes smaller as it separates from the front aluminum plate 30Ca. Thus, even if the metal walls 46p and 46q of the lattice 40C are inclined, the effect of suppressing the vertical polarized waves can be acquired. For example, the metal wall 46q may be formed in a planer shape extending in a direction Dr1 intersecting with the front aluminum plate 30Ca and extending in the y-axis direction.

Note that the connection of the metal wall 46 with the metal base plate 47 can be carried out similarly to the metal wall 46 and the metal base plate 47 of the second embodiment. Moreover, a height H6 of the metal wall 46 is determined similarly to the height H4 of the second embodiment.

(2-4) Laser welding

FIG. 15A shows a state where laser welding is performed, and FIG. 15B shows a cross section of the slot array antenna 10A assembled using the laser welding. As shown in FIG. 15A, the laser welding is performed by irradiating YAG laser beams 85 in a state where the lattice 40C is stacked on the emission waveguide 30C. At this time, although not illustrated in the figures, the convex portions of the front aluminum plate 30Ca fit into the concave portions (or holes) of the metal base plate 47 and is aligned, similar to the second embodiment.

As a result, as shown in FIG. 15B, the locations where the laser beams 85 hit melt, and welding parts 86 are formed by the welding of the front aluminum plate 30Ca and the metal base plate 47. FIG. 15B shows, for easier view of the welding parts 86, portions other than the welding parts 86 are not in contact with the front aluminum plate 30Ca and the metal base plate 47. However, in an actual case, the front aluminum plate 30Ca and the metal base plate 47 are welded in a state where they mutually contact in large area.

Two or more welding parts 86 are preferably formed in the y-axis direction, unlike those shown in the cross section of FIG. 15B. For example, the number of the welding parts 86 may be greater than the number of the emission slots 36 in the y-axis direction by one. Since the welding parts 86 may change in its metal composition or may be deformed by the welding, they are preferably formed at locations corresponding to the nodes of the electromagnetic waves and the nodes of the tube wall current.

Exemplary Use of Slot Array Antennas

The slot array antennas 10, 10A, 10B, and 10C described in the above embodiments may be used in a radar device. If the radar device is produced using the slot array antenna 10, 10A, 10B, or 10C, a weight-reduced radar device can be achieved.

Figure 16:
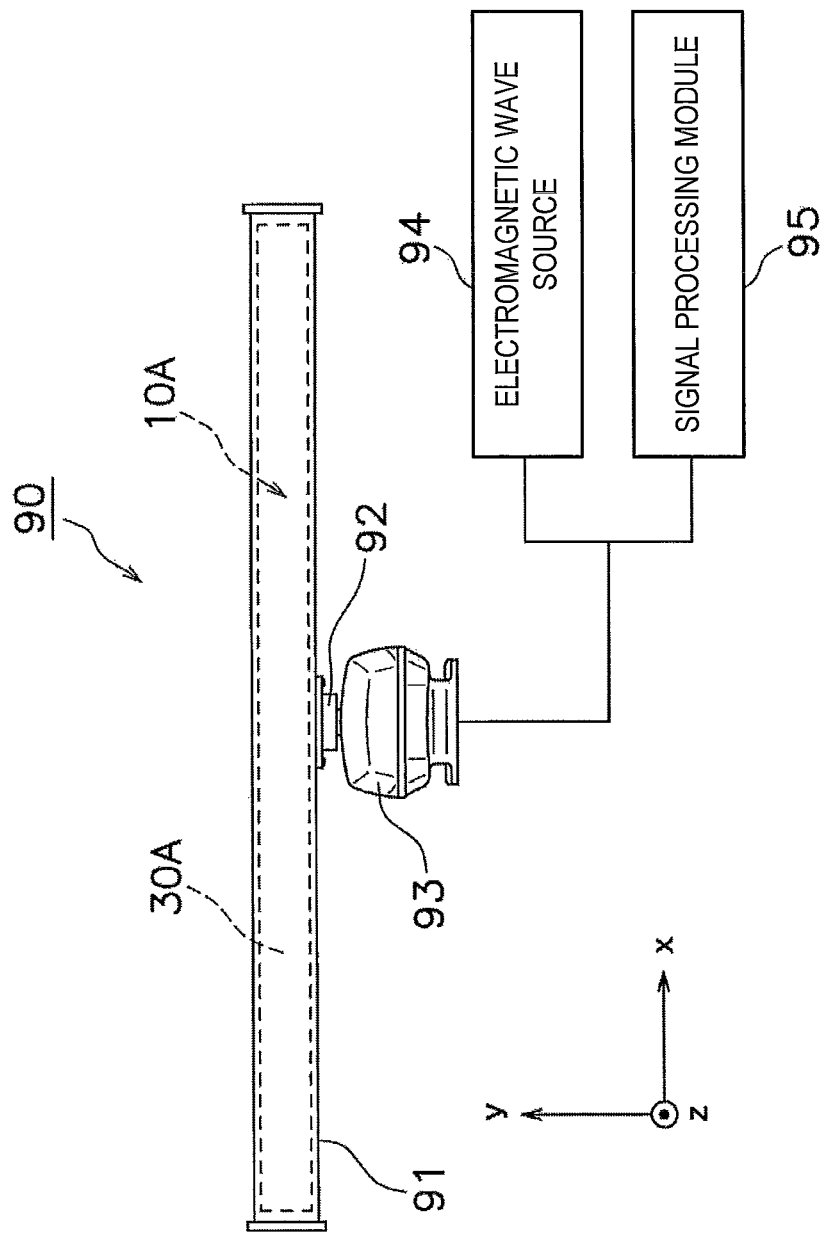
FIG. 16 is a block diagram showing a configuration of a radar device using a slot array antenna.

For example, as shown in FIG. 16, the slot array antenna 10A is housed within a casing of a radar part 91 of a radar device 90. The slot array antenna 10A rotates centering on a rotary part 92 within a horizontal plane (x-z plane) by the rotary part 92, along with the radar part 91. A motor which drives the rotary part 92 and peripherals of the motor are housed in a housing 93.

The electromagnetic waves are supplied to the emission waveguide 30A of the slot array antenna 10A from an electromagnetic wave source 94. Moreover, echo signals received by the slot array antenna 1 OA are processed by a signal processing module 95.

Features (1) In the slot array antenna 10, 10A, 10B, or 10C, the metal walls 41, 46, or 48 (conductor walls) which the lattice 40, 40A, 40B, or 40C has extend in the y-axis direction (vertical direction) along the columns of the emission slots 31, 36, or 37. Moreover, the metal walls 41, 46, or 48 extend in a direction perpendicular to the front aluminum plate 30a, 30Aa, 30Ba, or 30Ca (conductor surface), or an intersecting direction such as the direction Dr1. Moreover, the metal walls 41, 46, or 48 (conductor walls) thus formed are repeatedly arranged corresponding to the two or more emission slots 31, 36, or 37, respectively. For this reason, the side lobes of the electromagnetic waves emitted from the emission slot 31, 36, or 37 are further suppressed.

When the two or more metal walls 41, 46, or 48 are attached to the front aluminum plate 30a, 30Aa, 30Ba, or 30Ca (conductor surface) of the emission waveguide 30, 30A, 30B, or 30C, it takes more time and effort for attaching as the metal walls 41, 46, or 48 and, thereby, the cost of the slot array antenna 10, 10A, 10B, or 10C will increases. In the slot array antenna 10, 10A, 10B, or 10C, since the two or more metal walls 41, 46, or 48 are fixed to the metal base plate 42, 47, or 49 (base plate) of the lattice 40, 40A, 40B, or 40C, their assembly can be carried out easily by fastening the metal base plate 42, 47, or 49 to the front aluminum plate 30a, 30Aa, 30Ba, or 30Ca (conductor surface) with the clips 50 (fasteners), or laser welding or the like, thereby the slot array antenna 10, 10A, 10B, or 10C can be obtained at low cost. In addition, since the metal walls 41, 46, or 48 are fixed to the metal base plate 42, 47, or 49, the assembled product is robust.

For example, as for a configuration similar to the slot array antennas 10 described above, when a peak value of the side lobes of the vertical polarized waves appears at 135° in the roll angle θ, the emission intensity was about 1 dBi in a state where the metal walls 41 are not provided. However, when the metal walls 41 are attached, the measurement was reduced by about 10 dBi, and becomes about −9 dBi as a result. Further, when a 1-mm gap was formed between the metal walls 41 and the front aluminum plate 30a, the peak value of the side lobes increased in turn by 8 dBi which had been reduced to about −9 dBi as described above. Therefore, in order to secure the effect of reducing the peak value of the side lobes by the lattice 40, it is important to maintain the state where the metal base plate 42 closely contacts the front aluminum plate 30a.

Moreover, for example, as for a configuration similar to the slot array antennas 10 described above, when the metal walls 41 are not provided and the x-z plane is oriented horizontally, comparatively large side lobes are produced by an experiment at near 45° and 135° in the roll angle θ by inclining an angle φ by ±10°. On the other hand, when the metal walls 41 are provided, it is confirmed that the side lobes near 45° and 135° in the roll angle θ are reduced by about 8 to 12 dB.

(2) In order to introduce the electromagnetic waves into the waveguide space SS of the emission waveguide 30, 30A, 30B, or 30C formed by the front aluminum plate 30a, 30Aa, 30Ba, or 30Ca (conductor surface) and the back aluminum plate 30b 30Ab, 30Bb, or 30Cb (other conductor surface) parallel to the front aluminum plate, two or more introduction slots 21 or 26 (introduction slot array) open into the waveguide space SS of the emission waveguide 30, 30A, 30B, or 30C. The introduction waveguide 20 or 20A is formed so that the two or more introduction slots 21 or 26 (introduction slot array) excite within the emission waveguide 30, 30A, 30B, or 30C the electromagnetic waves in the high order mode in which two or more magnetic field loops Mr are located in line in the y-axis direction (vertical direction).

The emission slots 31, 36, or 37 of the emission waveguide 30, 30A, 30B, or 30C are formed so that the horizontal polarized wave planes (primary polarized wave planes) of the emission electric fields couple to the electromagnetic waves in the high order mode and are directed in the same direction, and the vertical polarized waves (polarized wave components) perpendicular to the horizontal polarized wave planes (primary polarized wave planes) are cancelled out by each other.

When the primary polarized wave planes are set horizontally, the two or more emission slots 31, 36, or 37 emit the electromagnetic waves which cancel out the vertical polarized waves. Further, by the two or more metal walls 41, 46, or 48 (conductor walls), the side lobes of the horizontal polarized waves can be suppressed and the electromagnetic waves from which the vertical polarized waves are suppressed can be emitted.

Moreover, the vertical polarized waves can fully be suppressed by coupling the metal walls 41, 46, or 48 (conductor walls) so that the metal walls surround the spaces SR on the electromagnetic wave emission side of the respective columns of the emission slots 31, 36, or 37. Moreover, by connecting the metal walls such as the metal walls 46b and 46c or the metal walls 48a and 48b or the metal walls 46p and 46q, they become robust and difficult to break.

(3) The metal base plate 42, 47, or 49 (base plate) is electrically coupled to the sides 41a or 46a of the respective metal walls 41, 46, or 48 (conductor walls) on the side of the front aluminum plate 30a, 30Aa, or 30Ba (conductor surface side). Moreover, the metal base plate 42, 47, or 49 (conductor layer) contacts the front aluminum plate 30a, 30Aa, or 30Ba (conductor surface) of the emission waveguide 30, 30A, or 30B. The length in the z-axis direction (vertical heights) of the numerous metal walls 41, 46, or 48 (two or more conductor walls) is ½×0.8-½×1.2 of the wavelength of the operating frequency. The height of the metal walls 41, 46, or 48 is measured from the contact surface between the front aluminum plate 30a, 30Aa, or 30Ba and the metal base plate 42, 47, or 49. The clips 50 or the screw fastening members 55 (fasteners) are attached to the emission waveguide 30, 30A, or 30B so that they do not project into the waveguide space SS which is the internal space of the emission waveguide 30, 30A, or 30B. The clips 50 or the screw fastening members 55 (fasteners) fasten the front aluminum plate 30a, 30Aa, or 30Ba to the metal base plate 42, 47, or 49 (conductor layer) which is stacked on the front aluminum plate 30a, 30Aa, or 30Ba (conductor surface) so that the metal base plate 42, 47, or 49 is pressed onto the front aluminum plate 30a, 30Aa, or 30Ba of the emission waveguide 30, 30A, or 30B.

Since the metal walls 41, 46, or 48 are electrically coupled to the metal base plate 42, 47, or 49 of the lattice 40, 40A, or 40B, the leak of the electromagnetic waves from between the front aluminum plate 30a, 30Aa or 30Ba and the side 41a or 46a of the metal walls 41, 46, or 48 on the side of the front aluminum plate 30a, 30Aa, or 30Ba can be prevented. Moreover, since the length of the metal walls 41, 46, or 48 in the z-axis direction is ½×0.8-½×1.2 of the wavelength of the operating frequency, the effect of suppressing the vertical polarized waves which the metal walls 41, 46, or 48 have can fully be exerted. Since the clips 50 or the screw fastening members 55 are attached to the emission waveguide 30, 30A, or 30B so that they does not project into the waveguide space SS, the disorder of the electromagnetic waves within the waveguide space due to the fasteners is eliminated. Therefore, it can prevent that the reduction effect of the vertical polarized waves from which the side lobes are suppressed is reduced by the disorder of the electromagnetic waves.

(4) The clips 50 (fasteners) are attached to the emission waveguide 30 or 30A so as to sandwich the front aluminum plate 30a or 30Aa (first metal plate) and the back aluminum plate 30b or 30Ab (second metal plate) of the emission waveguide 30 or 30A. Therefore, the clips 50 are firmly attached to the emission waveguide 30 or 30A while not projecting into the waveguide space SS.

Each clip 50 has the elastic part 53 that couples the first blade part 51 to the second blade part 52. By using the clip 50 of such a structure, the assembly of the slot array antenna 10 or 10A becomes easier. Moreover, by the elastic force of the elastic part 53, the state in which the metal base plate 42 or 47 of the lattice 40 or 40A is pressed against the front aluminum plate 30a or 30Aa can be maintained, thereby the leak of the electromagnetic waves can be prevented. Further, it can prevent that the side lobe reduction effect is reduced.

Moreover, the first blade part 51 of the clip 50 is formed in the comb shape. The clip 50 is designed, in the state where it sandwiches the metal base plate 42 or 47 of the lattice 40 or 40A and the back aluminum plate 30b or 30Ab, so that the teeth portions 51a of the first blade part 51 press the portions where the two or more metal walls 41 or 46 and the two or more emission slots 31 or 36 are not formed. Therefore, the contacting area between the teeth portions 51a of the first blade part 51 and the metal base plate 42 or 47 becomes larger, and it becomes easier to extend the contacting portion in the horizontal direction. Thereby, as shown in FIG. 1, the lattice 40 or 40A can be certainly fastened to the emission waveguide 30 or 30A throughout the emission waveguide 30 or 30A in the x-axis direction (horizontal direction), which are elongated in the x-axis direction.

Moreover, in the clip 50, since the protruded pieces 54 cover the boundary part where the metal base plate 42 or 47 contacts the front aluminum plate 30a or 30Aa of the emission waveguide 30 or 30A, the leak of the electromagnetic waves from the boundary part can be suppressed.

(5) The front aluminum plate 30a or 30Aa (first metal plate) and the back aluminum plate 30b or 30Ab (second metal plate) which constitute the emission waveguide 30 or 30A have a rectangular shape of the same size with the long sides having the length L shown in FIG. 3, and are arranged in parallel to each other. Moreover, the upper aluminum plate 30c (first support member) and the lower aluminum plate 30d (second support member) which constitute the sides of the emission waveguide 30 or 30A support the front aluminum plate 30a or 30Aa and the back aluminum plate 30b or 30Ab.

The ribs 42b or 47b are provided to the portions along the long sides of the front aluminum plate 30a or 30Aa of the metal base plate 42 or 47. The first blade part 51 has the tip parts 51aa (projecting parts) projected in the direction of the second blade part 52. When the clip 50 is pushed, while the tip parts 51aa being hooked at the rib 42b or 47b, the second blade part 52 line-contacts near the long side of the back aluminum plate 30b or 30Ab. Therefore, when the clip 50 is fitted, the second blade part 52 hits and slides on the corner of the emission waveguide 30 or 30A (near the long side of the back aluminum plate 30Ab or 30b), and the clip 50 is then snapped in with a small force. On the other hand, once the clip 50 is snapped in, since the first blade part 51 is caught by the rib 42b or 47b of the metal base plate, it is hard to remove, and since the second blade part 52 surface-contacts the back aluminum plate 30b or 30Ab, it is hard to slide and remove.

(6) Two of the many metal walls 46 or 48 (conductor walls) are arranged between the adjacent two columns (two of Ln1, Ln2, and Ln3) of the emission slots 36 or between the columns of the emission slots 37. The two metal walls 46 or 48 on both sides of the column of the emission slots 36 or 37 are designed so that they are coupled to each other to surround the space SR of the column of the emission slots 36 or 37 on the electromagnetic wave emission side. For example, since the two metal walls 46c and 46d on both sides of the column Ln2 of the emission slots 36 are designed so that they are coupled to each other to surround the space SR of the column Ln2 of the emission slots 36 on the electromagnetic wave emission side, the vertical polarized waves can fully be suppressed. Moreover, for example, since the metal walls 46c and 46d (conductor walls) are coupled to each other, this portion of the metal walls 46 of the lattice 40A becomes robust and hard to break.

(7) Since the electrically conductive wide part 57a of the cell spacer 57 (waveguide side coupling member) flattens the waveguide space side principal surface 30Bas in the state where it fits into the concave portion 30Bam of the waveguide space side principal surface 30Bas (inner principal surface), it can prevent that the disorder of the electromagnetic fields is caused in the waveguide space SS due to unevenness of the waveguide space side principal surface 30Bas. Since the narrow part 57b is exposed to the space on the electromagnetic wave emission side through the aperture part 30Ban continuing the emission side principal surface 30Bar (conductor surface) from a part of the concave portion 30Bam, the portion where the narrow part 57b is not formed among the wide part 57a is caught in other portions of the concave portion 30Bam, and thereby the cell spacer 57 is fastened to the emission waveguide 30B. Since the male screw 56 (lattice side coupling member) attached to the attaching part 49a of the metal base plate 49 (base plate) is coupled to the cell spacer 57 (waveguide side coupling member), the metal base plate 49 of the lattice 40B is also firmly coupled to the emission waveguide 30B.

(8) The electrically conductive member 80, which is arranged between the metal base plate 49 (base plate) of the lattice 40B and the front aluminum plate 30Ba (conductor surface) and electrically contacts the metal base plate 49 and the front aluminum plate 30Ba, is further provided. Therefore, the electrically conductive member 80 fills the gap between the metal base plate 49 and the front aluminum plate 30Ba to reduce the leak of the electromagnetic waves from the gap.

(9) As shown in FIG. 10C, the front aluminum plate 30Aa where the emission slots of the emission waveguide 30A are formed is arranged near the axial center of the antenna case 60 (cylindrical cover) of a substantially circular shape in cross section. Therefore, it makes easier to fasten the lattice 40A to the emission waveguide 30A using the clip 50 or the like.

Modifications (1) In the above embodiments, the emission slots 31, 36, or 37 are arrayed vertically and horizontally, which are perpendicular to each other, in the x-axis and y-axis directions. Although the emission slots 31, 36, or 37 are preferably arrayed vertically and horizontally which are perpendicular to each other, the perpendicularity is not essential.

(2) In the above embodiments, one or two metal walls 41, 46, or 48 are arranged respectively between the columns of the emission slots 31, 36, or 37. However, the number of the metal walls is not limited to one or two, and may be three or more.

(3) In the above embodiments, the introduction waveguide 20 or 20A and the emission waveguide 30 or 30B are rectangular metal waveguides made of aluminum plates. However, the present invention is applicable to a waveguide other than the metal waveguide, such as a waveguide which is formed with a low electrically conductive structural member, such as a plastic, and a thin metal film, or to a waveguide having a shape other than the rectangular shape, for example.

(4) In the above embodiments, the lattice 40, 40A, or 40B are entirely made of metal. However, the lattice may be formed with a low electrically conductive structural member, such as made of plastic, and a thin metal film. The base plate is not necessarily made of metal entirely, like the metal base plate 42, 47, or 49. It may be formed with a combination of a metal layer and a plastic plate. Moreover, the conductor wall is not necessarily made of metal entirely, like the metal wall 41, 46, or 48. It may be formed with a combination of a metal layer and a plastic plate.

(5) In the above embodiments, the clip 50 and the screw fastening member 55 are described as the fastener. However, fasteners other than the clip 50 and the screw fastening member 55 can also be used. As for the fastener, what sustains the force of pressing the lattice 40 or 40A against the emission waveguide 30 or 30A, like the clip 50, is preferable. Moreover, as for the fastener, what does not project into the waveguide space SS in the state where it is attached, like the clip 50 or the screw fastening member 55, is preferable. A metal band, a metal latch may also be used as the fastener. Moreover, laser welding is described as a fastening method in addition to the fastening method using the fasteners. However, the lattice may also be fastened to the emission waveguide by fitting and sandwiching the electrically conductive member 80, such as the electrically conductive cloth, between the metal base plate of the lattice and the emission waveguide, or by directly adhering with an electrically conductive adhesive.

Figure 17:
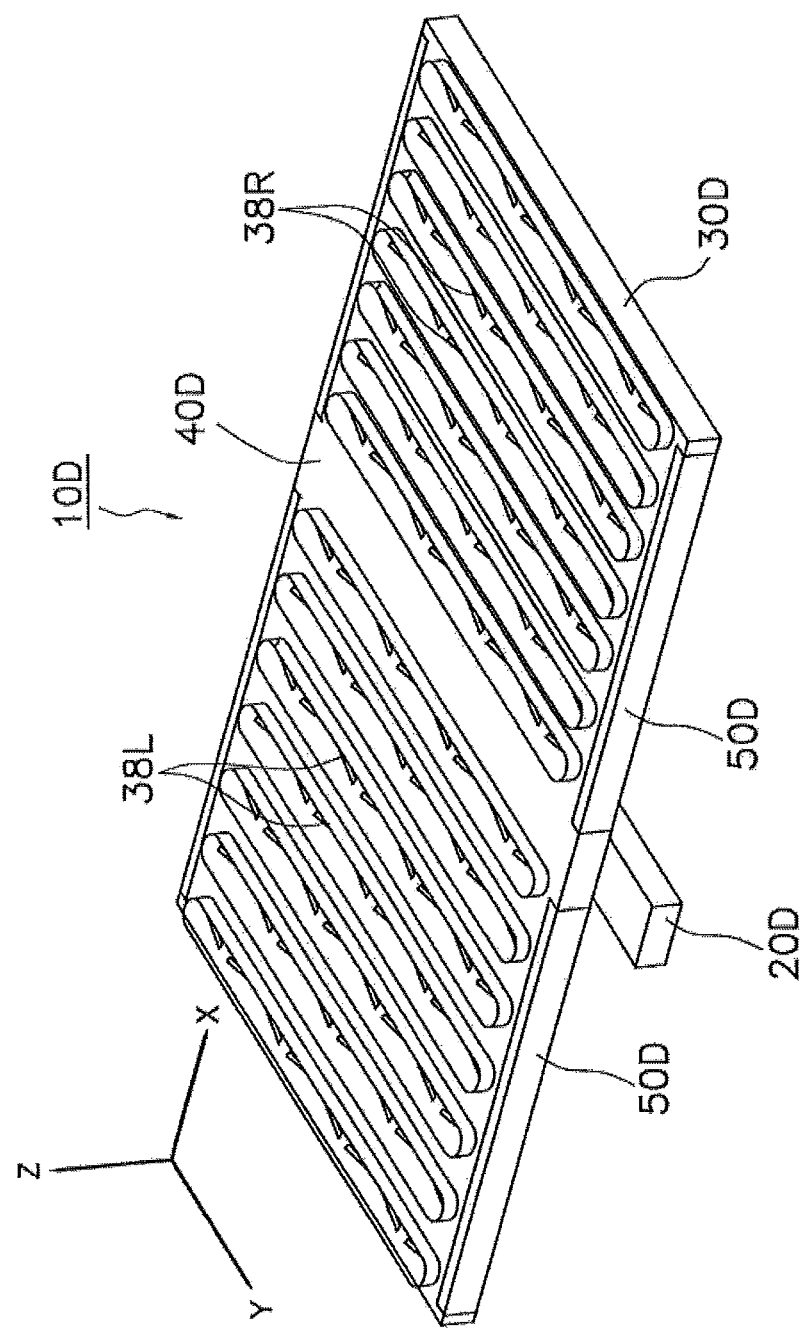
FIG. 17 is a perspective view showing a modification of the slot array antenna of the second embodiment.
Figure 18A:
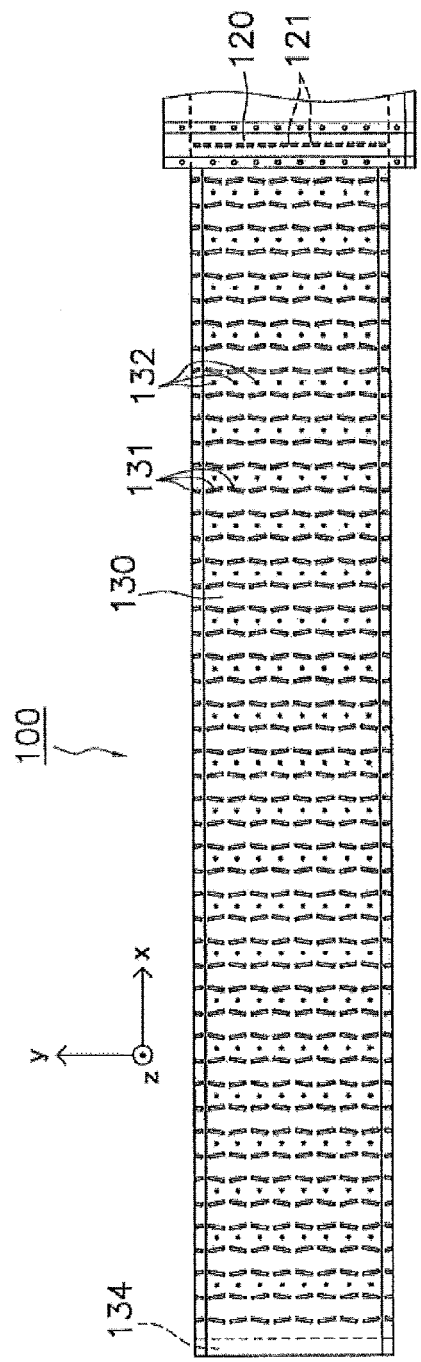
FIG. 18A is an elevational view of a conventional slot array antenna.
Figure 18B:
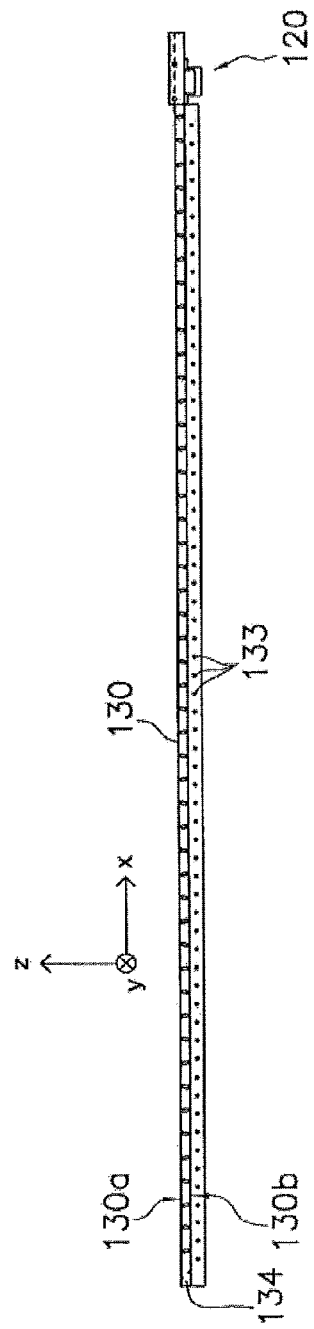
FIG. 18B is a bottom view of the conventional slot array antenna.

(6) In the above embodiments, the end-feeding type slot array antennas 10, 10A, 10B, and 10C are described, which feed the electromagnetic waves from one end of the emission waveguides 30, 30A, 30B, and 30C by using the introduction waveguides 20 and 20A. This does not mean that the slot array antenna to which the present invention can apply is not limited to the end-feeding type. The invention is also applicable to a center-feeding type slot array antenna 10D as shown in FIG. 17. The slot array antenna 10D shown in FIG. 17 is assembled by fastening a lattice 40D to an emission waveguide 30D with clips 50D. For example, in the center-feeding type slot array antenna 10D of FIG. 17, introduction slots of an introduction waveguide 20D is directed in the same direction, like one of the examples of the slot array antenna 10. The high order mode of the TE mode is generated within the emission waveguide 30D.

Geometry of two or more emission slots 38L and 38R formed in a front conductor surface of the emission waveguide 30D is fundamentally the same as the end-feeding type slot array antenna 10D of the second embodiment. However, in order to improve a VSWR (Voltage Standing Wave Ratio) of the antenna, the array pitch in the y-axis direction of the emission slots 38R on the right-hand side of the introduction waveguide 20D differs from the array pitch in the y-axis direction of the emission slots 38L on the left-hand side. The array pitch of the emission slots 38R of the emission waveguide 30D is shorter by 10% with respect to a half wavelength of a guide wavelength $\lambda g'$ (here, $\lambda g'$ is a guide wavelength within the emission waveguide 30D in the direction perpendicular to the electromagnetic wave propagating direction), which is a fundamental array pitch. Moreover, the emission slots 38L are arranged at an array pitch longer than the half wavelength of the guide wavelength $\lambda g'$ by 10%. Thereby, the direction of the beam of the electromagnetic waves emitted from the left-hand side is inclined rightward by about 3° with respect to the z-axis direction of the emission waveguide 30D, and the direction of the beam on the right-hand side is inclined leftward by about 3°. Thus, by shifting the array pitches of the emission slots 38R and 38L, phases of reflective waves produced in respective slots, the VSWR of the antenna can be improved. Also in such a slot array antenna 10D, by applying the lattice 40D, the side lobes can be suppressed even if it is used in a place where it shakes, such as a ship.

(7) In the above embodiments, the clip 50, of which the first blade part 51 is formed in a comb shape and where two or more teeth portion 51a are formed, is used. However, the shape of the clip 50 is not limited to such a shape. It may simply be a gutter shape with a channel shape in cross section, for example, as shown in FIG. 17. Thus, the shape may be suitably selected according to the shape of the lattice.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is designed in at least that way, but may also be configured in ways that are not listed.

What is claimed is:

1. A slot array antenna, comprising:
   an emission waveguide having a conductor surface where emission slot rows are formed and for guiding electromagnetic waves to be emitted from the emission slot rows, each of the emission slot rows having a plurality of emission slots are arrayed in line; and
   a lattice, the lattice including:
      a plurality of conductor walls formed in a planer shape so as to extend in a direction intersecting with the conductor surface and repeatedly arranged corresponding to the plurality of emission slots; and
      a base plate coupling and fixing the plurality of conductor walls thereto, the base plate being fastened to the conductor surface of the emission waveguide.

2. The slot array antenna of claim 1, wherein the emission waveguide guides the electromagnetic waves in a horizontal direction along the conductor surface, and the emission slot rows are formed by arranging the plurality of emission slots in the horizontal direction; and
   wherein each of the plurality of conductor walls is formed in a planer shape extending in a vertical direction along the conductor surface and the intersecting direction, and the plurality of conductor walls are repeatedly arranged in the horizontal direction corresponding to the plurality of emission slots.

3. The slot array antenna of claim 2, wherein the plurality of emission slot rows are formed in the vertical direction in the conductor surface of the emission waveguide.

4. The slot array antenna of claim 1, wherein two of the plurality of conductor walls are arranged between the adjacent emission slots, and adjacent two of the conductor walls on both sides of each of the emission slots are coupled to each other to surround a space of the emission slot on the electromagnetic wave emission side.

5. The slot array antenna of claim 2, wherein two of the plurality of conductor walls are arranged between the adjacent emission slots, and adjacent two of the conductor walls on both sides of each of the emission slots are coupled to each other to surround a space of the emission slot on the electromagnetic wave emission side.

6. The slot array antenna of claim 3, wherein two of the plurality of conductor walls are arranged between the adjacent emission slots, and adjacent two of the conductor walls on both sides of each of the emission slots are coupled to each other to surround a space of the emission slot on the electromagnetic wave emission side.

7. The slot array antenna of claim 4, further comprising an introduction waveguide having an introduction slot array that opens to the emission waveguide to introduce the electromagnetic waves into the emission waveguide, wherein the introduction slot array excites within the emission waveguide the electromagnetic waves in a high order mode in which a plurality of magnetic field loops are located in line in the vertical direction;
    wherein the emission waveguide further has another conductor surface that are arranged in parallel to the conductor surface and opposes to the conductor surface; and
    wherein the plurality of emission slots of the emission waveguide is formed so that primary polarized wave planes of emission electric fields couples to the electromagnetic waves in a high order mode and is directed in the same direction, and polarized wave components perpendicular to the primary polarized wave planes are cancelled out by each other.

8. The slot array antenna of claim 1, wherein the base plate has a conductor layer that is electrically coupled to sides of the plurality of the conductor walls on the side of the conductor surface of the emission waveguide and contacts the conductor surface;
    wherein a height of the plurality of conductor walls with respect to the conductor surface is set between $\frac{1}{2} \times 0.8$ to $\frac{1}{2} \times 1.2$ of a wavelength of an operating frequency; and
    wherein the slot array antenna further comprising a fastener attached to the emission waveguide so as not project into an internal space of the emission waveguide and fastening the conductor surface of the emission waveguide to the base plate that is stacked onto the conductor surface so that the conductor layer are pressed against the conductor surface of the emission waveguide.

9. The slot array antenna of claim 8, wherein the conductor surface of the emission waveguide is formed from a first metal plate;
    wherein the emission waveguide has a second metal plate arranged in parallel to and opposing to the first metal plate; and
    wherein the fastener is attached to the emission waveguide so as to sandwich the first metal plate and the second metal plate.

10. The slot array antenna of claim 9, wherein the fastener is a clip having a first blade part for pushing the base plate, a second blade part for pushing the second metal plate, and an elastic part connecting the first blade part with the second blade part.

11. The slot array antenna of claim 10, wherein the first blade part is formed in a comb shape; and
    wherein the clip is designed, in a state where the clip pinches the base plate and the second metal plate, so that teeth portion of the first blade part presses an area where the plurality of conductor walls and the plurality of emission slots are not formed.

12. The slot array antenna of claim 10, wherein the clip further has a protruded piece covering a boundary part between the base plate and the conductor surface of the emission waveguide.

13. The slot array antenna of claim 9, wherein the first metal plate and the second metal plate have a rectangular shape of the same size so that corresponding long sides of the metal plates are in parallel to each other;
    wherein the emission waveguide further has a first support member and a second support member supporting the long sides of the first metal plate and the long sides of the second metal plate, respectively;
    wherein the base plate has ribs provided along the long sides of the first metal plate of the emission waveguide;
    wherein the first blade part has a projecting part projecting in the direction of the second blade part so that, when the clip is pushed to be attached in a state where the projecting part of the first blade part is hooked on the rib, the second blade part line-contacts near the long side of the second metal plate, and the second blade part then surface-contacts the surface of the second metal plate in a state where the clip pinches the second metal plate and the base plate.

14. The slot array antenna of claim 1, further comprising a fastener including a lattice side coupling member and an electrically conductive waveguide side coupling member coupled to the lattice side coupling member, and for fastening the base plate of the lattice to the conductor surface of the emission waveguide;
    wherein the emission waveguide includes a conductor plate having a concave portion formed in an inner principal surface facing an internal space of the emission waveguide and an aperture part continuing from a part of the concave portion to the conductor surface;
    wherein the base plate of the lattice has a attaching part to which the lattice side coupling member is attached; and
    wherein the waveguide side coupling member has a wide part fitted in the concave portion to flatten the inner principal surface and a narrow part extending from the wide part so as to be coupled to the lattice side coupling member, while being exposed to a space on the electromagnetic wave emission side through the aperture part.

15. The slot array antenna of claim 1, further comprising an electrically conductive member arranged between the base plate of the lattice and the conductor surface and electrically contacting the base plate and the conductor surface.

16. A radar device, comprising:
    the slot array antenna of claim 1;
    an electromagnetic wave source for supplying the electromagnetic waves to the emission waveguide;
    a rotary part for rotating the slot array antenna; and
    a signal processing module for processing of an echo signal received by the slot array antenna.

17. A radar device, comprising:
    the slot array antenna of claim 2;
    an electromagnetic wave source for supplying the electromagnetic waves to the emission waveguide;
    a rotary part for rotating the slot array antenna; and
    a signal processing module for processing of an echo signal received by the slot array antenna.

18. A radar device, comprising:
    the slot array antenna of claim 3;
    an electromagnetic wave source for supplying the electromagnetic waves to the emission waveguide;
    a rotary part for rotating the slot array antenna; and
    a signal processing module for processing of an echo signal received by the slot array antenna.

19. A radar device, comprising:
    the slot array antenna of claim 1; and
    a cylindrical cover having a substantially circular shape in cross section, for covering the slot array antenna;
    wherein the conductor surface is arranged near the axial center of the cylindrical cover.

20. A radar device, comprising:
the slot array antenna of claim 2; and
a cylindrical cover having a substantially circular shape in cross section, for covering the slot array antenna;
wherein the conductor surface is arranged near the axial center of the cylindrical cover.

* * * * *